(12) United States Patent
Smith et al.

(10) Patent No.: US 9,953,284 B2
(45) Date of Patent: Apr. 24, 2018

(54) SYSTEMS AND METHODS FOR PRIORITIZING FUNDING OF PROJECTS

(71) Applicant: THE AEROSPACE CORPORATION, El Segundo, CA (US)

(72) Inventors: Patrick L. Smith, Arroyo Grande, CA (US); Matthew Phillip Ferringer, Round Hill, VA (US)

(73) Assignee: The Aerospace Corporation, El Segundo, CA (US)

( * ) Notice: Subject to any disclaimer, the term of this patent is extended or adjusted under 35 U.S.C. 154(b) by 121 days.

(21) Appl. No.: 13/837,782

(22) Filed: Mar. 15, 2013

(65) Prior Publication Data
US 2014/0278695 A1    Sep. 18, 2014

(51) Int. Cl.
*G06Q 10/06*    (2012.01)

(52) U.S. Cl.
CPC .............................. *G06Q 10/06313* (2013.01)

(58) Field of Classification Search
CPC ................................................ G06Q 10/06313
USPC ...................................................... 705/7.23
See application file for complete search history.

(56) References Cited

U.S. PATENT DOCUMENTS

| 5,568,500 | A | 10/1996 | Tolson |
| 6,532,076 | B1 | 3/2003 | Sidorowich |
| 7,835,929 | B2 * | 11/2010 | Bennett ........................ 705/7.11 |
| 7,996,344 | B1 | 8/2011 | Goel |
| 8,069,127 | B2 | 11/2011 | Taylor et al. |
| 8,255,344 | B2 | 8/2012 | Ferringer et al. |
| 8,255,345 | B2 | 8/2012 | Ferringer et al. |
| 8,285,653 | B2 | 10/2012 | Ferringer et al. |
| 8,433,662 | B2 | 4/2013 | Ferringer et al. |
| 2005/0187846 | A1 * | 8/2005 | Subbu et al. ................... 705/36 |

(Continued)

OTHER PUBLICATIONS

Muhlenbein, Heinz et al.; "Evolution in time and space—the parallel genetic algorithm.", 1991; Morgan Kaufmann; pp. 1-22.

(Continued)

*Primary Examiner* — Andre Boyce
(74) *Attorney, Agent, or Firm* — Lee & Hayes, PLLC

(57) ABSTRACT

Systems and methods for providing a prioritization of the focus and allocation of available resources and/or funding for due diligence analyses of a variety of candidate projects competing for limited funding are disclosed. Various methods may also determine a confidence level metrics associated with the information and/or estimates associated with the candidate projects. Evolutionary algorithms may be applied to perform multi-objective optimization of objectives based, at least in part, on currently available information and/or estimates associated with the candidate projects. A priority score, for the purpose of allocating due diligence attention and resources to increase confidence levels in assumptions associated with candidate projects, may be determined for a particular project based, at least in part, on the current confidence level associated with that particular project and the percentage of non-dominated projects within which the particular project is included. The optimization may be performed multiple times, such as once for every stakeholder that may have provided information and/or estimates associated with the candidate projects, to identify a plurality of non-dominated solutions to the optimization problem.

18 Claims, 17 Drawing Sheets

(56) References Cited

U.S. PATENT DOCUMENTS

| | | |
|---|---|---|
| 2008/0010044 A1 | 1/2008 | Ruetsch |
| 2010/0292929 A1 | 11/2010 | Ferringer et al. |
| 2010/0293120 A1 | 11/2010 | Ferringer et al. |
| 2010/0293122 A1 | 11/2010 | Ferringer et al. |
| 2011/0078100 A1 | 3/2011 | Goel |
| 2012/0029965 A1* | 2/2012 | Steffen et al. ............... 705/7.23 |
| 2012/0084314 A1 | 4/2012 | Ferringer et al. |

OTHER PUBLICATIONS

Cantu-Paz, Erick et al.; "Efficient parallel genetic algorithms: theory and practice." 2000; Comput. Methods Appl. Mech. Engrg. 186 (2000) pp. 221-238; Elsevier Science S.A.

Search Report and Written Opinion for International Application No. PCT/US2010/034955 dated Aug. 17, 2010.

Ferringer, Matthew P. et al.; "Many-objective Reconfiguration of Operational Satellite Constellations with the Large-Cluster Epsilon Non-dominated Sorting Genetic Algorithm-11." 2009 IEEE Congress on Evolutionary Computation, 10 pages.

Ferringer, Matthew P. et al., "Pareto-hypervolumes for the Reconfiguration of Satellite Constellations." AIAA/AAS Astrodynamics Specialist Conference and Exhibit. Aug. 18-21, 2008, p. 1-31.

Yong Tang, "Advancing Hydrologic Model Evaluation and Identification Using Multiobjective Calibration Sensitivity Analysis and Parallel Computation." ProQuest Information and Learning Company. 2007, 48 pages.

Scott Zimmer et al., "Utilizing Evolutionary Algorithms for Problems with Vast Infeasible Regions and Expensive Function Evaluations." The Aerospace Corporation. Jun. 27, 2008, 12 pages.

Theodore R. Stodgell et al., "Satellite Rendezvous Tours Using Multiobjective Evolutionary Optimization." The Pennsylvania State University. 28 pages.

Joshua B. Kollat et al., "A Framework for Visually Interactive Decision-making and Design using Evolutionary Multiobjective Optimization (VIDEO)" Environmental Modelling & Software 22. 2007, 1691-1704.

Joshua B. Kollat et al., "A New Epsilon-Dominance Hierarchical Bayesian Optimization Algorithm for Large Multiobjective Monitoring Network Design Problems" Advances in Water Resources 31. 2008, 828-845.

Y. Tang et al., "Parallelization Strategies for Rapid and Robust Evolutionary Multiobjective Optimization in Water Resources Applications." Advances in Water Resources. 2006, 1-39.

Patrick M. Reed et al. "Parallel Evolutionary Multi-Objective Optimization on Large. Heterogeneous Clusters: An Applications Perspective." Journal of Aerospace Computing Information and Communication. vol. 5. Nov. 2008, 460-478.

Allison Barker, "Aerospace Competes in International Global Trajectory Optimization Competition." Orbiter. vol. 48, No. 3. Mar. 27, 2008, 1 page.

Anonymous, <http://www.apptimation.com/Technology/Technology.html>, 1 page.

Matthew P. Ferringer et al.. "Efficient and Accurate Evolutionary Multi-Objective Optimization Paradigms for Satellite Constellation Design." Journal of Spacecraft and Rockets. vol. 44. No. 3, May-Jun. 2007. 682-691.

J.B. Kollat et al., "A Computational Scaling Analysis of Multiobjective Evolutionary Algorithms in Long-Term Groundwater Monitoring Applications." Advances in Water Resources. Jan. 25, 2006. 1-24.

J.B. Kollat et al., "Comparing state-of-the-art evolutionary multi-objective algorithms for long-term groundwater monitoring design." Advances in Water Resources 29 (2006): 792-807. <www.elsevier.com/locate/advwatres>.

Kalyanmoy Debet al., "Evaluating the epsilon-Domination Based Multi-Objective Evolutionary Algorithm for a Quick Computation of Pareto-Optimal Solutions." Evolutionary Computation (13)4: 501-525.

Joshua B. Kollat et al., "The Value of Online Adaptive Search: A Performance Comparison of NSGAII, epsilon-NSGAII and epsilonMOEA." Springer-Verlag Berlin Heidelberg 2005. 386-398.

Kalyanmoy Debet al., "A Fast and Elitist Multi-Objective Genetic Algorithm: NSGA-11" KanGAL Report No. 200001. 20 pages.

David A. Van Veldhuizen et al., "Considerations in Engineering Parallel Multiobjective Evolutionary Algorithms." IEEE Transactions on Evolutionary Computation. vol. 7, No. 2, Apr. 2003. 144-173.

Matthew P. Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Laumanns, Marco et al.; "Combining Convergence and Diversity in Evolutionary Multi-Objective Optimization"; 2002; Massachusetts Institiute of Technology; Evolutionary Computation 10(3); pp. 1-21.

Deb, Kalyanmoy et al.; "Omni-Optimizer: A generic evolutionary algorithm for single and multi-objective optimization"; 2006; Elsevier; European Journal of Operational Research 185 (2008); pp. 1062-1087.

Ventura, Sebastian et al.; "JCLEC: a Java framework for evolutionary computation"; 2007; Springer-Verlag; pp. 381-392.

Chuang, Angela S. et al.; "An Extensible Genetic Algorithm Framework for Problem Solving in a Common Environment"; 2000; IEEE; Transactions on Power Systems, vol. 15, No. 1; pp. 269-275.

Tan, K. C. et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.

Shajulin Benedict and V. Vasudevan, "Scheduling of Scientific Workflows Using Niched Pareto GA for Grids"; 2006, IEEE pp. 908-912.

David A. Van Veldhuizen et al., "(Final Draft) TR-98-03 Multiobjective Evolutionary Algorithm Research: A History and Analysis" Oct. 14, 1998; pp. 1-30.

Jeffrey Horn, et al.; "A Niched Pareto Genetic Algorithm for Multiobjective Optimization" 1994; IEEE; pp. 82-87.

Mark Erickson et al.; Multi-objective Optimal Design of Groundwater Remediation Systems: Application of the Niced Pareto Genetic Algorithm (NPGA); Advances in Water Resources 25 (2002); pp. 51-65.

Ferringer, Matthew P. "General Framework for the Reconfiguration of Satellite Constellations." <http://etda.libraries.psu.edu/theses/approved/WorldWideIndex/ETD-3537/index.html>, 40 pages.

Related U.S. Appl. No. 13/799,819, filed Mar. 13, 2013.

\* cited by examiner

| S | pe1 | pe2 | pe3 | pe4 | pe5 | pe6 | pe7 | pe8 | pe9 |
|---|-----|-----|-----|-----|-----|-----|-----|-----|-----|
| 0 | 41% | 4%  | 42% | 13% | 23% | 3%  | 13% | 25% | 58% |
| 1 | 10% | 35% | 19% | 16% | 59% | 77% | 57% | 16% | 4%  |
| 2 | 4%  | 1%  | 13% | 61% | 17% | 20% | 28% | 0%  | 38% |
| 3 | 7%  | 39% | 26% | 10% | 0%  | 0%  | 3%  | 59% | 0%  |
| 4 | 46% | 0%  | 0%  | 0%  | 0%  | 0%  | 0%  | 0%  | 0%  |
| 5 | 13% | 0%  | 0%  | 0%  | 0%  | 0%  | 0%  | 0%  | 0%  |

FIG. 9A

| S | pe1 | pe2 | pe3 | pe4 | pe5 | pe6 | pe7 | pe8 | pe9 |
|---|-----|-----|-----|-----|-----|-----|-----|-----|-----|
| 0 | 90% | 50% | 90% | 80% | 90% | 90% | 90% | 90% | 90% |
| 1 | 90% | 50% | 30% | 90% | 20% | 70% | 50% | 70% | 90% |
| 2 | 90% | 50% | 10% | 70% | 30% | 50% | 10% | 90% | 10% |
| 3 | 50% | 10% | 10% | 20% | 0%  | 10% | 10% | 10% | 0%  |
| 4 | 20% | 0%  | 0%  | 0%  | 0%  | 0%  | 0%  | 0%  | 0%  |
| 5 | 20% | 0%  | 0%  | 0%  | 0%  | 0%  | 0%  | 0%  | 0%  |

FIG. 9B

| S | pe1 | pe2 | pe3 | pe4 | pe5 | pe6 | pe7 | pe8 | pe9 |
|---|---|---|---|---|---|---|---|---|---|
| 0 | 4 | 2 | 4 | 3 | 2 | 0 | 1 | 2 | 6 |
| 1 | 1 | 17 | 13 | 2 | 48 | 23 | 28 | 5 | 0 |
| 2 | 0 | 1 | 12 | 18 | 12 | 10 | 25 | 0 | 34 |
| 3 | 4 | 53 | 23 | 8 | 0 | 0 | 3 | 53 | 0 |
| 4 | 37 | 0 | 0 | 0 | 0 | 0 | 0 | 0 | 0 |
| 5 | 10 | 0 | 0 | 0 | 0 | 0 | 0 | 0 | 0 |

FIG. 9C

SYSTEMS AND METHODS FOR PRIORITIZING FUNDING OF PROJECTS

FIELD OF THE DISCLOSURE

Aspects of the disclosure are related generally to prioritizing the funding of a plurality of projects competing for funding.

BACKGROUND OF THE DISCLOSURE

In organizations, such as companies or government agencies, multiple potential projects may be proposed for evaluation and/or executions. Often times the resources available for evaluation and/or execution of projects by a particular organization may be limited such that all of the proposed projects for evaluation and/or execution may not be resourced or funded. Further, at times, the resources available for funding projects within a particular organization may change over time, such as due to changes in the organization's budget, and the organization may have to dynamically determine how to execute projects in light of the imposed changes in resources. This may entail the organization adding or subtracting projects that it evaluates and/or executes responsive to changes in the organization's budget.

Organizations may implement a variety of mechanisms to select projects to evaluate and/or execute from a larger set of proposed projects in a resource and/or funding constrained environment. Often times, the stake holders associated with each of the projects, such as the project managers and/or project team members, may discuss various aspects of the proposed projects, such as expected benefits, risks associated with the project, cost estimates, time to completion, importance and/or linkages to other projects, other intangibles, or the like. The decisions of which projects to fund or priorities associated with the funding of competing projects may be swayed by influential stake holders or by other considerations that may not fully optimize the expected value or expected regret resulting from the selection from the competing projects.

Portfolio selection and optimization methods generally assume the same or similar levels of confidence in the information about the costs, benefits, and risks of potential candidate projects under consideration for funding. However, in reality, the level of confidence in the information associated with candidate projects, understanding of potential program alternatives, and proposed new development projects may vary relatively significantly from project to project. Some projects may be well understood, with relatively high confidence in their cost estimates, development risks, and benefits assessments and/or estimates. On the other hand, competing projects that involve new concepts or technologies, which may in fact, in some cases, have significant advantages over current or more established (and better understood) approaches yet may have relatively less confidence in the projections and/or estimations of information associated therewith. Imbalance in the levels of confidence among different projects competing for funding may result in regrets that could have been avoided if due diligence resources had been more optimally allocated, to increase the confidence in promising but less well understood candidates projects. Often due diligence resources are spent refining already well established candidates that are either almost certain to be selected for funding or almost certain not to be selected because their selection would violate a selection constraint.

BRIEF DESCRIPTION OF THE DRAWINGS

Reference will now be made to the accompanying drawings, which are not necessarily drawn to scale, and wherein:

FIG. 9A illustrates an example chart of the appearance of various projects in non-dominated solutions of an evolutionary algorithm to illustrate the prioritization of funding projects, in accordance with example embodiments of the disclosure.

FIG. 9B illustrates an example chart of the confidence level of estimated project values of the various projects of FIG. 9A to illustrate the prioritization of funding projects, in accordance with example embodiments of the disclosure.

FIG. 9C illustrates an example chart of the priority score of the various projects of FIG. 9A to illustrate the prioritization of funding projects, in accordance with example embodiments of the disclosure.

DETAILED DESCRIPTION

Figure 1:
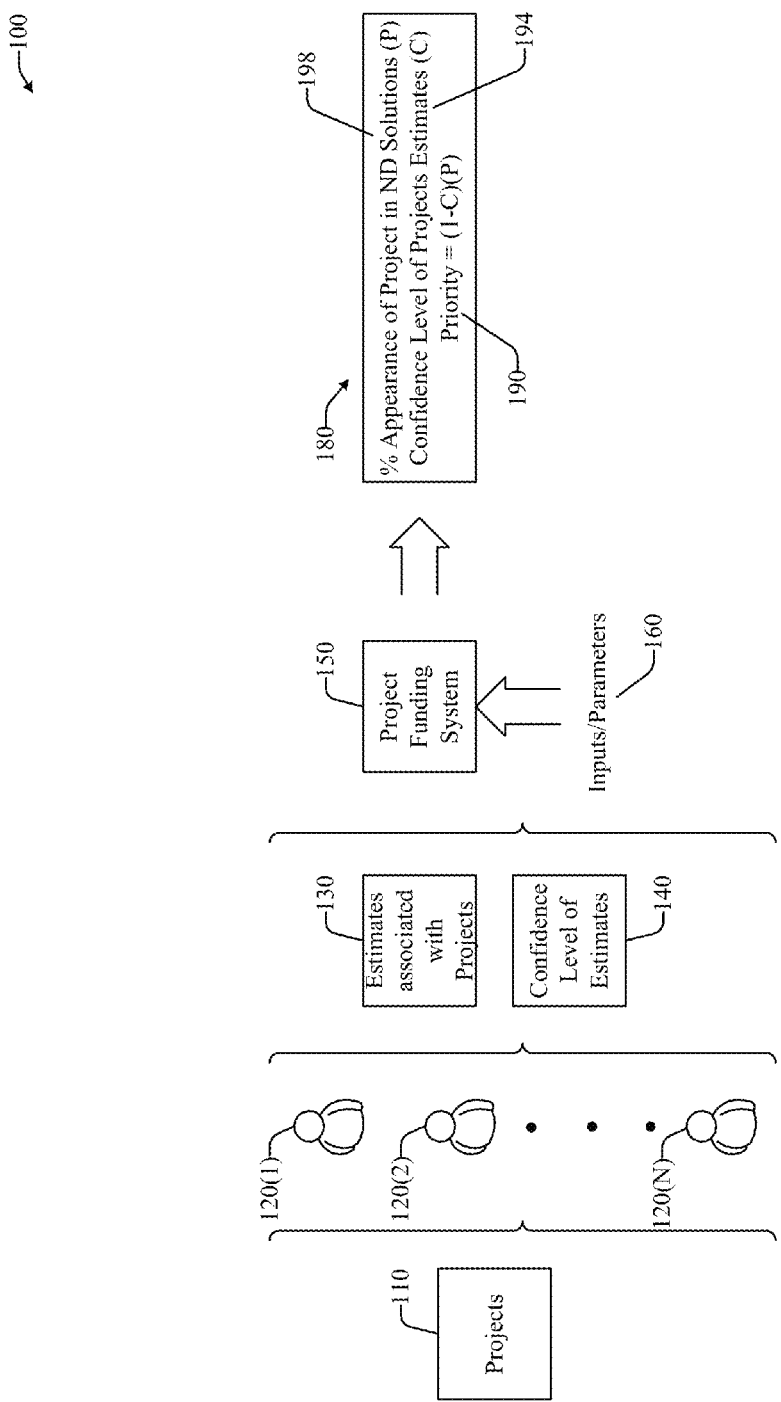
FIG. 1 illustrates an example ecosystem for prioritizing the funding of projects, in accordance with embodiments of the disclosure.

Embodiments of the disclosure now will be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

The systems and methods disclosed herein may provide for efficiently allocating scarce analysis resources (such as concept exploration, preliminary design efforts and cost estimation) to optimize the relevance and value of due diligence information obtained about projects competing for limited portfolio funding. The systems and methods may involve applying evolutionary algorithms in the decision making process of allocating funding to projects. Embodiments of the disclosure may, therefore, relate to the use of evolutionary algorithms in prioritizing the funding of projects.

Evolutionary algorithms have been described in a variety of other publications including commonly owned U.S. patent application Ser. No. 12/550,858, filed on May 12, 2010 and titled "Systems and Methods for Generating Feasible Solutions form Two Parents for an Evolutionary Process", the contents of which, in its entirety, is incorporated herein by reference.

Additionally, the systems and methods disclosed herein may consider that information and/or estimates related to a variety of candidate projects for funding and used in assessing the variety of candidate projects may not have the same level of detail and/or certainty in the information and/or estimates. These estimates may pertain to evaluation metrics and/or elements that may be applied to a value model to determine an optimal set and/or portfolio of projects based on a particular set of estimates. The metrics may include, for example, expected and potential benefits, risks associated with the project, cost estimates, time to completion, importance and/or linkages to other projects, and/or other intangibles. Conventional non-quantitative methods of deciding the allocation of due diligence resources to candidate projects with asymmetric confidence in estimates associated with those candidate projects may introduce a variety of inefficiencies and/or other issues. For example, without a big-picture portfolio view of the initial estimates of the feasibility and utility of the candidate projects, a great deal of effort may be inefficiently spent trying to normalize the confidence in costs, benefits, and risks (to try and achieve "apples-to-apples" confidence levels) prior to applying portfolio-selection and optimization tools. In the same or other cases, due diligence analyses resources or the time available may be too limited to study attractive but immature project options to the extent required to achieve "decision-quality" assessment of their costs, benefits, and risks, and as a possible consequence, less attractive, but well established project options may be prioritized above potentially more attractive but immature projects.

The mechanisms, as disclosed, may formulaically and methodologically reduce regret and/or buyer's remorse in funding particular ones of a larger set of candidate projects. The mechanism may involve determining a confidence factor associated with the current understanding and information, such as the expected benefits and/or other metrics, of each of the projects under consideration for funding. The mechanism may further involve determining a number of non-dominated solutions based on a variety of objectives using any variety of optimization algorithm, such as an evolutionary algorithm, and identifying the percentage of those non-dominated solutions in which each project appears.

In certain embodiments, a score or metric, such as one that ranges from 0 to 100, may be generated and used to prioritize or rank candidate projects for consideration in receiving additional attention and analysis resources for relatively in-depth study, such as studies that may lead to improved understanding and confidence in the projects' costs, benefits, and risks. This metric may be referred to as a due diligence priority score (referred to henceforth simply as "priority score"). In general, the embodiments disclosed may adhere to the logic that a project that appears in many feasible non-dominated portfolios and yet at the current time has low confidence of understanding and/or low confidence in estimates is a better candidate for more due diligence study than a project that either has high confidence understanding and/or only appears in a few or none of the non-dominated portfolios. The priority metric may be a function of a confidence factor associated with the current level of understanding and/or estimates of a project and the percentage of feasible non-dominated portfolio solutions that contain each proposed candidate project. In certain embodiments, the priority metric may be a product of 1 minus a 0 to 1 confidence factor associated with the current level of understanding and/or estimates of a project and the fraction of feasible non-dominated portfolio solutions that contain each proposed candidate project.

I. Ecosystem Overview

FIG. 1 illustrates an example ecosystem 100 for prioritizing the funding of projects, in accordance with embodiments of the disclosure. In an organization or across organizations, there may be a plurality of projects 110 that may be candidates for funding to achieve the overall goals of the organization. One or more of the projects 110 may have one or more project advocates and/or stake holders 120(1), 120(2), 120(N), hereinafter referred to individually or collectively as stake holders 120. The stake holders 120 may provide estimates associated with the projects 130 and, in certain embodiments, confidence levels 140 associated with the estimates. The estimates 130 associated with the candidate projects, and the confidence levels 140 of those estimates may be provided to a project funding system 150. Additional parameters 160, such as epsilon square/box sizes, constraints, or the like, may be provided to the project funding system 150. The project funding system 150 may then be configured to provide a variety of priority metrics 180 associated with the candidate projects 110. These priority metrics 180 may include the percentage 198 of each of the projects found as part of the totality of non-dominated (ND) solutions found as a result of executing an optimization algorithm by an optimization algorithm system, such as an evolutionary algorithm system. The project funding system 150 may further provide the confidence of level 194 of the estimates associated with the projects. The project funding system 150 may further still provide a priority score 190 associated with the candidate projects.

The organization with which the candidate projects 110 are associated may be any suitable organization including, but not limited to, a corporation, a for-profit organization, a non-profit organization, an individual, a government organization, a government agency, a domestic organization, a foreign organization, a multi-national organization, or combinations thereof. The candidate projects 110 may be activities, alternative activities, and/or a series of actions, in the form of a project, that may be considered by one or more of the stake holders 120 to further one or more goals and/or assumed goals of the organization. The stake holders 120 may be individuals within or external to the organization and may be an advocate of one or more of the projects 110. The stake holder 120 may include, but not be limited to, a project manager, a project lead, a project engineer, a project worker, a contractor, a beneficiary from the execution of one or more of the projects 110, an individual that may promote one or more of the projects 110, or combinations thereof. It will be appreciated that in some cases, a single stake holder 120 may decide between, propose, advocate, and/or promote more than on project 110. Indeed, in some cases, there may be a single stake holder 120 that decides between more than one project using the systems and methods as disclosed herein. The estimates 130 associated with projects as depicted here may include estimates and/or projections of potential and expected benefits, risks, cost estimates, time to completion, importance and/or linkages to other projects, other intangibles, or the like.

As depicted, the project funding system 150 may receive one or more confidence level information 140 of estimate values 130. In some cases, the project funding system 150 may be configured to determine a confidence level 194 of a particular project from the received confidence level information 140 at an estimate level. For example, the project funding system 150 may receive a variety of certainty levels associated with estimates made by one or more stake holders 120. From these confidence level information 140 of estimates related to a single project 110, the project funding system 150 may determine the confidence level 194 of the estimates associated with the project 110, such as by taking an average of the confidence level of the received information of the project 110. In alternative cases, the project funding system 150 may perform a variety of mathematical functions on the received confidence level information 140 of estimated values related to a project, such as a weighted average, to determine the confidence level 194 of the estimates associated with the project 110. Therefore, it will be appreciated that in some embodiments, the current confidence level 104 of the estimates associated with a project 110 may be an aggregate of the individual confidence levels associated with each of the estimates provided by each of the stake holders 120. It should further be noted that in some cases, the confidence level information 140 of estimated values may be correlated to and/or based on one or more established methods of providing confidence levels for project planning and/or funding. For example, technology readiness level (TRL) or similar assessments and/or methodology may be implemented by the stake holders 120 to provide confidence level information 140 of estimated values.

The inputs/parameters 160, in certain embodiments may include parameters associated with one or more objective functions for performing multi-objective optimization, such as by applying the evolutionary algorithms as described herein. The objective functions may be used by the evolutionary algorithms to determine an objective value and/or objective performance associated with a particular chromosome data structure of the evolutionary algorithm. In this case, a chromosome data structure may represent a potential solution to a multi-objective evolutionary algorithm. Additionally or alternatively, the inputs/parameters 160 may include parameters associated with constraint functions used in the evolutionary algorithms for determining if a particular chromosome data structure is a viable solution within the constraints of the optimization problem. For example, the constraint functions may be used to determine if a particular chromosome data structure of the evolutionary algorithm represents a solution that is bound by funding constraints imposed on the selection of candidate projects 110.

In certain embodiments, the inputs/parameters 160 may include information related to providing parameters for epsilon non-dominated sorting, such as epsilon values. Epsilon non-domination sorting may include plotting or mapping the solutions to a first epsilon value for objective function $f_1$ and a second epsilon value for objective function $f_2$, with a particular step size $\epsilon_1$ and $\epsilon_2$, respectively. The first epsilon value may be associated with a first epsilon spacing or step size $\epsilon_1$ associated with objective function $f_1$, and a second epsilon value may be associated with second epsilon spacing or step size $\epsilon_2$ associated with objective function $f_2$. It will be appreciated that while two objective functions are discussed, there may be any number of objective functions and associated epsilon values. It will further be appreciated that the number of non-dominated solutions to the multi-objective optimization problem and the time it takes to achieve a solution may vary with the epsilon values as specified and/or used. Therefore, in certain embodiments, the number of non-dominated solutions generated may be based, at least in part, on both the number of sets of estimates provided by the stake holders 120 and the epsilon values provided to the evolutionary algorithm system.

II. Project Funding System

Figure 2:
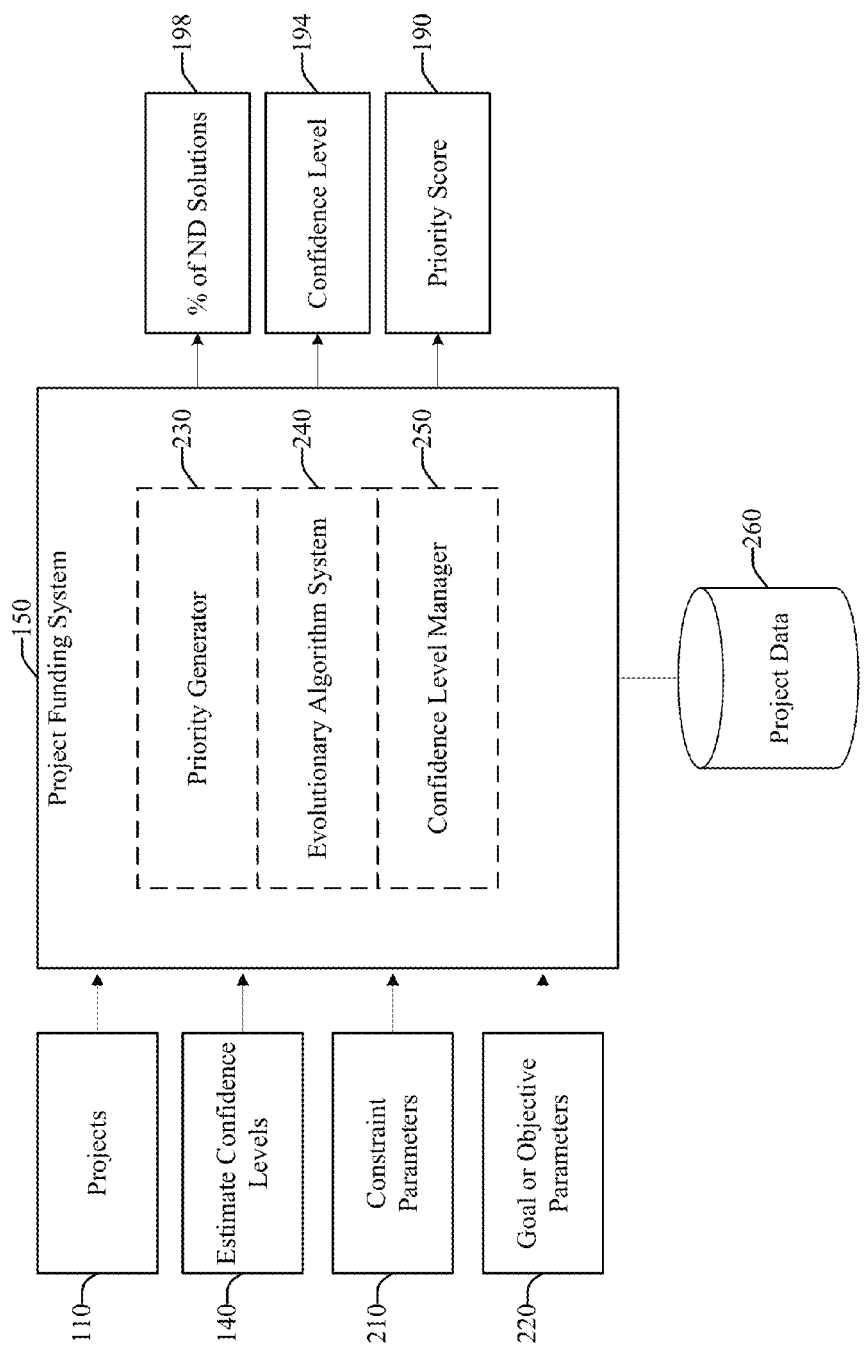
FIG. 2 illustrates an example project funding system for prioritizing the funding of projects, in accordance with embodiments of the disclosure.

Referring now to FIG. 2, an example project funding system 150 for prioritizing the funding of projects, in accordance with embodiments of the disclosure, is described. As described in conjunction with the ecosystem 100 described in FIG. 1, the inputs to the project funding system 150 may include, without limitation, indication of one or more projects 110, one or more confidence levels of information and/or estimates associated with the projects 110, constraint parameters 210 associated with the evolutionary algorithms, and/or goal parameters 220 associated with the evolutionary algorithms.

The due diligence resource allocation and/or funding system 150 may include a priority generator component 230, an evolutionary algorithm system 240, and a confidence level manager component 250. The system 150 may further communicate with, store, and/or retrieve information and/or data from a project database 260. The project database may include a store of information and/or estimates associated with the various projects 110. As indicated, the system 150 may further be configured to provide output, such as percentage of non-dominated solutions 194 in which a particular project appears, confidence level 194 associated with a project, and/or priority score 190 associated with a project. Additionally, the system 150 may be configured to provide a ranking of the priority of the candidate projects 110. This ranking may be based, at least in part, on the priority score associated with each of the projects 110.

In certain embodiments, the priority score may be determined based on the confidence level (C) of the project and the percentage appearance in the non-dominated solutions of the evolutionary algorithm (P). In these embodiments, the priority score may be calculated as Priority=(1−C)P. In this case, C may be a number between 0 and 1 and P may be a number between 0 and 1. It will be appreciated that either or both of C or P may scaled by a constant factor, in certain embodiments of the disclosure.

III. Evolutionary Algorithm—Core Management System

Figure 3A:
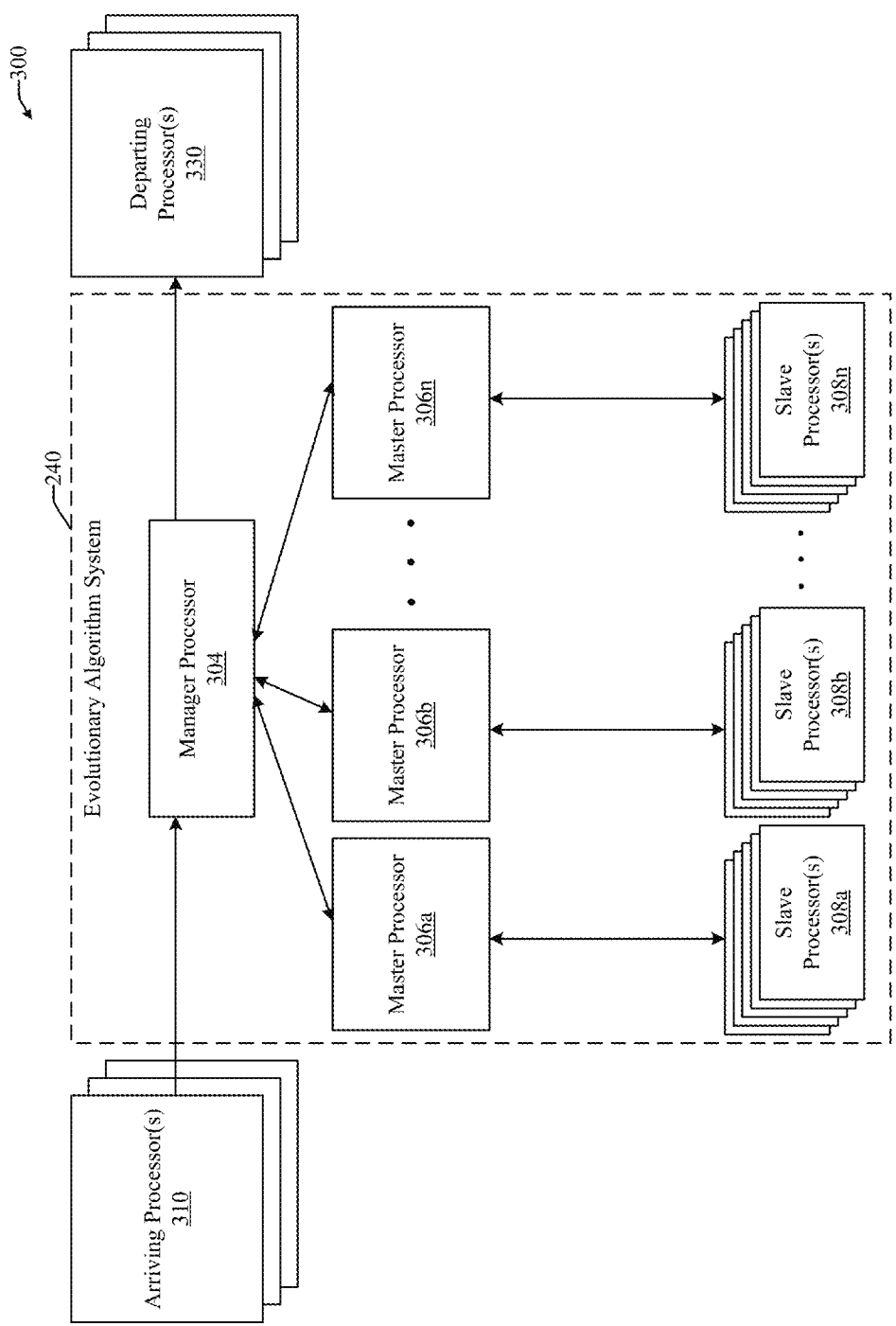
FIG. 3A illustrates an example evolutionary algorithm system, in accordance with example embodiments of the disclosure.

FIG. 3A illustrates an example core management system 300 that supports parallel processing utilized for one or more evolutionary algorithms associated with multi-objective optimization, as described herein, according to an example embodiment of the invention. As shown in FIG. 3A, an example evolutionary algorithm component 240 in which processing associated with one or more evolutionary algorithms is managed and performed is depicted. The processing environment may include one or more manager processor computers 304 (also referred to as "manager processors"), master processor computers 306a-n (also referred to as "master processors"), and slave processor computers 308a-n (also referred to as "slave processors").

The manager processor 304 may be operative to dynamically configure and reconfigure the evolutionary algorithm component 240. In general, the manager processor 304 may make a dynamic determination of how many master processors 306a-n are needed, and how many slave processor(s) 308a-n are needed for each master processor 306a-n. The determination of the number of slave processor(s) 308a-n per master processor 306a-n can be based upon a master calibration algorithm, as will be discussed in further detail herein.

During initial set-up or configuration of the evolutionary algorithm component 240, the manager processor 304 may identify a number of available arriving processor(s) 310 having processing capacity. These arriving processor(s) 310 may be available for utilization, perhaps as a result of another application processing being completed. The manager processor 304 may configure one or more of the arriving processor(s) 310 as master processors 306a-n. Each master processor 306a-n may be responsible for one or more operations associated with a particular portion of the evolutionary algorithm. The manager processor 304 may also configure and assign one or more of the arriving processor(s) 310 as the respective one or more slave processors 308a-n of the respective master processor 306a-n. The slave processors 308a-n may likewise carry out one or more operations as instructed by the respective master processor 306a-n.

Subsequent to the initial-setup or configuration, the manager processor 304 may also be operative to dynamically reconfigure the evolutionary algorithm component 240. As an example of such reconfiguration, additional arriving processor(s) 310 may be identified by the manager processor 304 as being available while the evolutionary algorithm component 240 is in operation. Accordingly, the manager processor 304 may assign roles to the additional arriving processor(s) 310. For example, an additional arriving processor 310 may be assigned to a role as a manager processor 304, a master processor 306a-n, or a slave processor(s) 308a-n. On the other hand, one or more master processors 306a-n or slave processor(s) 308a-n in the evolutionary algorithm component 240 may become exhausted (e.g., allocated processing time has been reached), and may need to be removed from the evolutionary algorithm component 240 as a departing processor(s) 330. The departing processor(s) 330 may be a manager processor 304, a master processor 306a-n, or a slave processor 308a-n that has experienced a processing failure or that has otherwise been requested by a higher priority application.

In an example embodiment of the invention, a manager processor 304 that is exhausted may remove itself from the evolutionary algorithm component 240. The departing manager processor 304 may be operative to nominate its replacement, perhaps from an arriving processor 310, an existing master processor 306a-n, or an existing slave processor 308a-n. According to another example embodiment, a master processor 306a-n that is exhausted may need to be removed from the evolutionary algorithm component 240. The removed master processor 306a-n may likewise nominate its replacement, perhaps from another master processor 306a-n or an existing slave processor 308a-n. Alternatively, the manager processor 304 may determine the replacement for the removed master processor 306a-n. In addition, a slave processor(s) 308a-n that is exhausted may need to be removed from the evolutionary algorithm component 240, according to an example embodiment of the invention. The master processor 306a-n may replace the removed slave processor(s) 308a-n with an arriving processor(s) 310 when possible and needed, according to an example embodiment of the invention. The master processor 306a-n may inform the manager processor 304 of the removal of a slave processor(s) 308a-n and/or its replacement.

As introduced above, the manager processor 304 may determine the number of master processors 306a-n needed, and/or the number of slave processor(s) 308a-n needed per master processor 306a-n in accordance with an example master calibration algorithm. It will be appreciated that a manager processor 304 may utilize an example master calibration algorithm in a variety of instances, e.g., based upon arriving processor(s) 310 or departing processor(s) 330, or when one or more master processor processors 306a-n report that it has too many or too few slave processors(s) 308a-n.

In an example embodiment of the invention, a goal of a master processor 306a-n may be to keep the associated slave processors 308a-n fed with work as efficiently as possible. When a slave processor 308a-n requests work from the master processor 306a-n (e.g., sends a packet with results from evaluating the previously received chromosome data structure), the master processor 306a-n is most efficient in responding to the slave processor 308a-n when it is waiting for the packet (e.g., the master processor 306a-n is not busy doing other things).

One or more of the processors, in certain embodiments, may further execute the functions of the priority generator component 230 and/or the confidence level manager component 250. For example, the manager processor 304 may both be part of the evolutionary algorithm system 240 and execute the evolutionary algorithm in cooperation with the slave processors 308 and be part of one or both of the priority generator component 230 or the confidence level manager component 250 to execute the priority scores or the confidence levels, respectively.

Figure 3B:
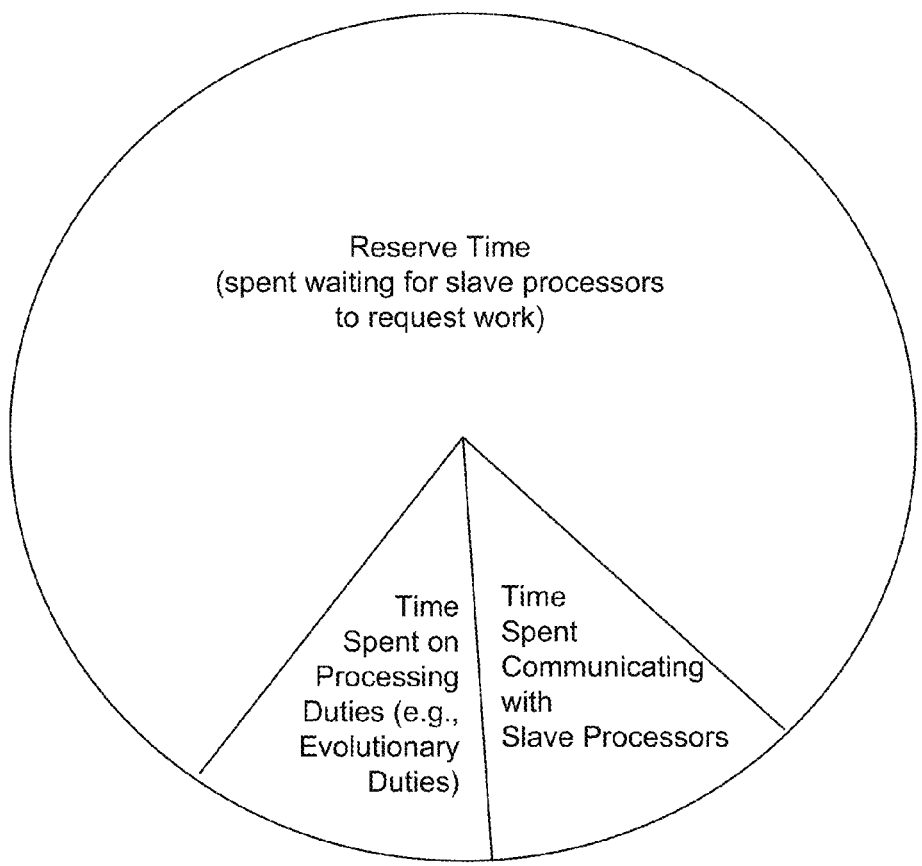
FIG. 3B illustrates an example master processor timing chart, according to an example embodiment of the disclosure.

As shown by the master processor timing chart in FIG. 3B, the "Reserve Time" is the time that the master processor 306a-n is waiting for work. If there is too much Reserve Time, then the master processor 306a-n has capacity to handle more slave processors 308a-n. As the number of slave processors 308a-n increases for a particular master processor 306a-n, the total time spent by a master processor 306a-n performing processing (e.g., evolutionary duties) increases, as does the total time spent communicating with slave processors 308a-n. Therefore, the master calibration algorithm may use the current timing data to estimate how many slave processors 306a-n would bring the Reserve Time into compliance with a Reserve_Time_Percentage threshold, as described below.

For purposes of utilizing the master calibration algorithm, each master processor 306a-n may maintain timing data associated with available processing resources at the master processor 306a-n. In an example embodiment of the invention, the timing data maintained by each master processor 306a-n may include the following data:

A total elapsed time in which the particular master processor 306a-n has been in operation (Total_Elapsed_Time);

A total time that the particular master processor 306a-n spends communicating with associated slave processor(s) 308a-n to send work and receive results (Total_Time_Communicating_with_Slaves); and A total time spent by a master processor 306a-n performing processing (e.g., evolutionary duties or operations) in accordance with one or more evolutionary algorithms (Total_Time_Spent_Performing_Processing_Duties).

Using the timing data, the manager processor 304 or each master processor 306a-n may be able to calculate a target number of slave processor(s) 308a-n that it can handle in accordance with the master calibration algorithm. In an example embodiment of the invention, the target number of slave processor(s) 308a-n ("Target_Number_of_Slaves") for a particular master processor 306a-n can be determined according to the following calculations:

Target_Reserve_Time=Reserve_Time_Percentage* Total_Elapsed_Time. In an example embodiment of the invention, the Reserve_Time_Percentage may be set between 10% (0.10)-20% (0.20), perhaps at 15% (0.15), so that the particular master processor 306a-n may retain some reserve processing capability. However, it will be appreciated that other values may be utilized for the Reserve_Time_Percentage without departing from example embodiments of the invention.

Average_Time_Communicating_With_Slaves=Total_Time_Communicating_with_Slaves/Number_Chromosomes_processed, where the Number_Chromosomes_processed represents the number of chromosomes processed within the Total_Elapsed_Time.

Average_Time_Spent_On_Processing_Duties=Total_Time_Spent_Performing_Processing_Duties/Number_Chromosomes_processed.

Target_Number_of_Slaves=((Total_Elapsed_Time−Target_Reserve_Time)/(Average_Time_Communicating_with_Slaves+Average_Time_Spent_On_Processing_Duties))*(Current_Number_of_Slaves/Number_Chromosomes_processed), where the Current_Number_of_Slaves represents the current number of slave processor(s) 308a-n assigned to the particular master processor 306a-n.

If any master processor 306a-n does not have the calculated Target_Number_of_Slaves, then an example reallocation algorithm may be invoked by the manager processor 304. An example reallocation algorithm may initiate with a manager processor 304 requesting that each master processor 306a-n provide the manager processor 304 with its respective calculated Target_Number_of_Slaves and its respective actual number of slave processor(s) 308a-n that has been assigned to the respective master processor 306a-n. The manager processor 304 may then determine whether any master processor 306a-n is underweighted or overweighted with respect to calculated Target_Number_of_Slaves. In particular, a master processor 306a-n is underweighted with respect to slave processor(s) 308a-n if the actual number of slave processor(s) 308a-n is less than the calculated Target_Number_of_Slaves. Likewise, a master processor 306a-n is overweighted with respect to slave processor(s) 308a-n if the actual number of slave processors is more than the calculated Target_Number_of_Slaves.

If one or more master processors 306a-n are overweighted with respect to the calculated Target_Number_of_Slaves, then slave processor(s) 308a-n associated with the overweighted master processors 306a-n may be reallocated to underweighted master processors 306a-n. Likewise, underweighted master processors 306a-n may also be provided one or more arriving processor(s) 310 for use as slave processors(s) 308a-n. Once all the master processors 306a-n meet their respective Target_Number_of_Slaves, then the manager processor 304 may designate a portion of any remaining arriving processor(s) 310 as new master processors 306a-n, where each new master processor 306a-n receives a default number of arriving processor(s) 310 for use as slave processor(s) 308a-n.

It will be appreciated that the evolutionary algorithm component 240 described herein may accommodate a large number of processors. Indeed, the processing environment may easily utilize over 25,000 processors without any significant loss in processing efficiency, according to an example embodiment of the invention.

Figure 3C:
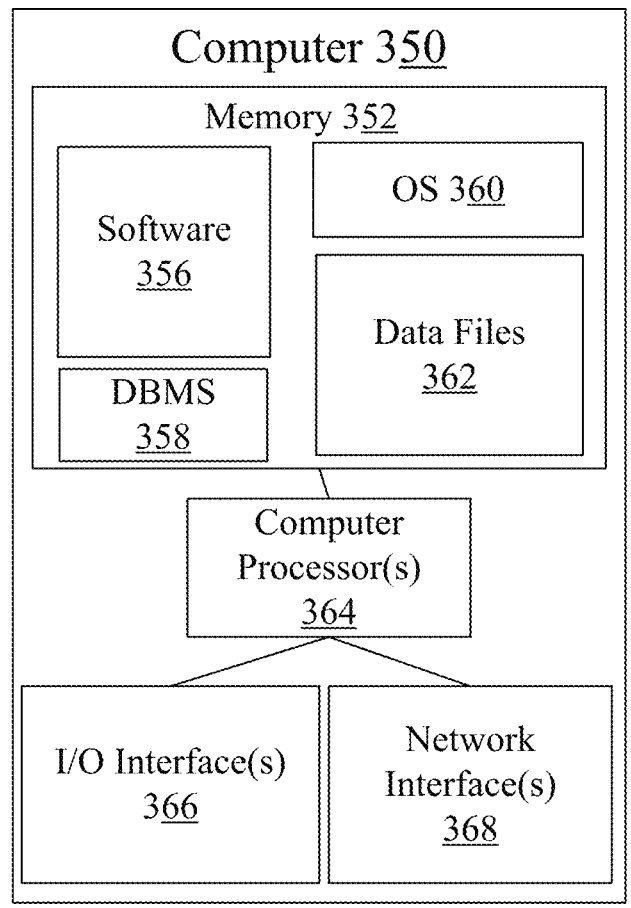
FIG. 3C illustrates an example computer for implementing one or more of the processors in FIG. 1A, according to an example embodiment of the disclosure.

The processors described in FIG. 3A, including the processors 304, 306a-n, 308a-n, 310, and 330, may implemented and/or as a part of the computer 350, or a variation thereof, illustrated in FIG. 3C. The computer 350 may be any processor-driven device, such as, but not limited to, a personal computer, laptop computer, server computer, cluster computer, and the like. In addition to having one or more computer processor(s) 364, the computer 350 may further include a memory 352, input/output ("I/O") interface(s) 366, and network interface(s) 368. The memory 352 may be any computer-readable medium, coupled to the computer processor(s) 364, such as RAM, ROM, and/or a removable storage device for storing data files 362 and a database management system ("DBMS") 358 to facilitate management of data files 362 and other data stored in the memory 352 and/or stored in separate databases. The memory 352 may also store various program modules, such as an operating system ("OS") 360 and software 356. The software 356 may comprise one or more software programs for managing, configuring, or performing one or more operations of a project funding algorithm including, but not limited to, a confidence level management algorithm, a priority score algorithm, and an evolutionary algorithm, according to an example embodiment of the invention.

The I/O interface(s) 366 may facilitate communication between the computer processor(s) 364 and various I/O devices, such as a keyboard, mouse, printer, microphone, speaker, monitor, bar code readers/scanners, RFID readers, and the like. Likewise, the network interface(s) described herein may take any of a number of forms, such as a network interface card, a modem, a wireless network card, and the like.

Numerous other operating environments, system architectures, and device configurations are possible, beyond those illustrated in FIGS. 3A and 3C. Other system embodiments can include fewer or greater numbers of components and may incorporate some or all of the functionality described with respect to FIGS. 3A and 3C. Accordingly, embodiments of the invention should not be construed as being limited to any particular operating environment, system architecture, or device configuration.

II. Parallel Processing Optimization without Infeasible Space Management

A. System Overview

Figure 4:
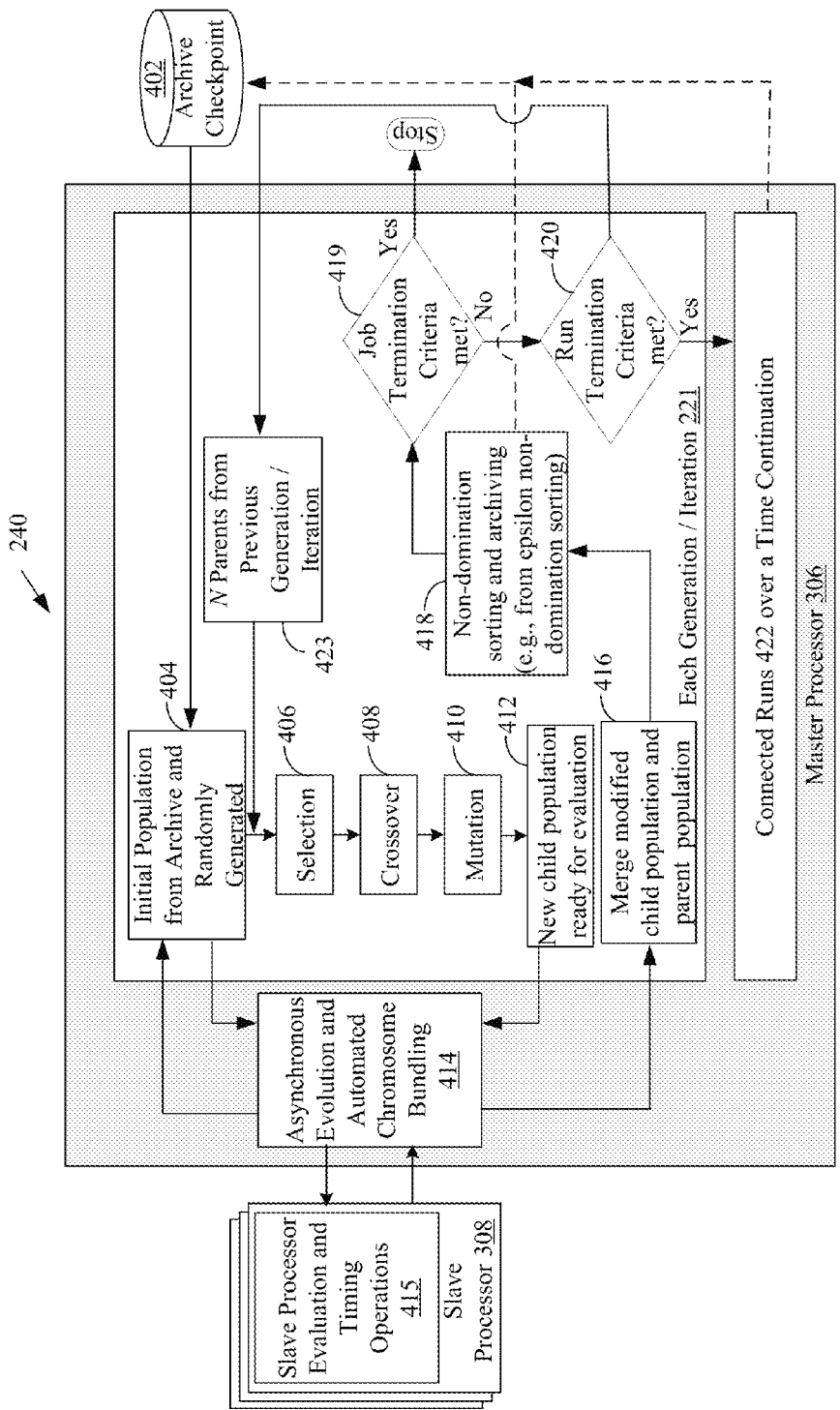
FIG. 4 illustrates an example parallel processing system that executes an evolutionary algorithm in accordance with an example embodiment of the disclosure.

FIG. 4 illustrates an example evolutionary algorithm component in the form of a parallel processing system 240 that executes an evolutionary algorithm, according to an example embodiment of the invention. The evolutionary algorithm, as performed by the parallel processing system 240 may produce one or more non-dominated solutions to an optimization problem involving the optimization of the selection of one or more candidate projects 110. As shown in FIG. 4, a first portion of the evolutionary algorithm may be performed by a master processor 306 while a second portion of the evolutionary algorithm may be performed by one or more slave processors 108, as discussed herein.

In an example embodiment of the invention, an executed job of the evolutionary algorithm may comprise a plurality of connected runs 422 that occur in a sequence to form a time continuation. Each run 422 may comprise one or more evolutionary operations performed during one or more generations/iterations 421. It will be appreciated that a run may be connected to a prior run in that at least some of the same parents are shared in the "initial population" utilized for initiating respective runs, according to an example embodiment of the invention.

Example processing by an executed job of the evolutionary algorithm will now be discussed in further detail. Referring now to block 404, the master processor 306 may receive or obtain an initial population of parent chromosome data structures. In an example embodiment of the invention, each parent chromosome data structure may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Still referring to block 404, the initial population of parent chromosome data structures may be obtained by one or more sources. It will be appreciated that in certain embodiments, the parent chromosome data structures may represent a known solution to funding projects, such as a known good or pretty good solution. In an example embodiment of the invention, the initial population of parent chromosome data structures may be obtained from a combination of the archive checkpoint 402 and random generation of new chromosome data structures. For example, 25% of the initial population of parent chromosome data structures may be obtained from the archive checkpoint 402 while 75% of the initial population may be randomly generated. The chromosomes obtained from the archive checkpoint 402 may have previously been evaluated in accordance with the objective functions. On the other hand, the randomly generated chromosomes may not have been evaluated in accordance with the objective functions, and thus, they may be delivered to block 414, which allocates the chromosomes to the slave processors 308 for objective function evaluation by block 415.

The archive checkpoint 402 may include an elite set of chromosome data structures (i.e., elite solutions) obtained from one or more prior generations/iterations 421, according to an example embodiment of the invention. The archive checkpoint 402 may take the form of a data file or database stored in a computer memory, computer disk, network storage, or other non-volatile memory. As the archived chromosome data structures were previously evaluated in a prior generation/iteration 421, these chromosome data structures may be associated with a plurality of objective function values corresponding to a respective plurality of objective functions. Each objective function may be associated with any predefined objective to be optimized by the executed job of the evolutionary algorithm. As a non-limiting example, an objective function may be associated with a particular military objective, achieved by a selection of candidate projects 110. As another non-limiting example, an objective function may be associated with expected profit from the selection of the candidate projects 110 in the form of financial transactions.

Alternatively, in block 404, the initial population of parent chromosome data structures may be produced from only randomly generated chromosomes. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 414, which allocates the chromosomes to the slave processors 308 for objective function evaluation by block 415. Once the objective function evaluations evaluation in block 415 have been completed, and the objective function values have been received in block 414, then each of the randomly generated parent chromosome data structures may be associated with a respective plurality of objective function values.

Having received or obtained the initial population of parent chromosome data structures in block 404, processing may then proceed to block 406. In block 406, the master processor 306 may select pairs of parent chromosome data structures from the input population of parent chromosome data structures. In an example embodiment of the invention, the selection of the pairs of parent chromosome data structures, representing a selection of candidate projects, may occur according to a tournament selection process, which may include a crowded tournament selection process. An example tournament selection process in accordance with an example embodiment of the invention may occur by first selecting two pairs with equal probability based upon a uniform distribution of the input population. Then each pair of chromosome data structures competes in a tournament where the individual with the best fitness is retained. It will be appreciated that best fitness may be determined according to domination rank (as described herein) and where the domination rank is the same, the greatest crowding distance (e.g., nearest neighbor with respect to the entire population in accordance with a measure of diversity) wins the tournament. Other measures of diversity may be used without departing from example embodiments of the invention. The winners of each tournament become the two parents resulting from the selection process of block 406. It will be appreciated that a predetermined number of pairs of parent chromosome data structures may be selected in block 406. It will also be appreciated that a particular parent chromosome data structure may be present in two or more selected pairs of parent chromosome data structures, according to an example embodiment of the invention.

Following block 406, the chromosomes in selected pairs of parent chromosome data structures may be subject to one or more evolutionary operators to generate a plurality of child chromosome data structures, according to an example embodiment of the invention. Two example evolutionary operators are illustrated by blocks 408 and 410. For example, block 408 illustrates a crossover evolutionary operator in which a portion of the parameter values or "gene" values may be exchanged between chromosomes in selected pairs of parent chromosome data structures to generate new pairs of chromosome data structures. In an example embodiment of the invention, the crossover evolutionary operation may be capable of performing crossover using integer or non-integer numbers (e.g., double precision numbers, etc.), binary representation of numbers, letters, and/or symbols. As another example, block 410 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the invention, only a portion or percentage of the received chromosomes in the chromosome data structures in blocks 408 and 410 may have their genes crossed-over or mutated, respectively. The respective portions or percentages that are crossed-over and/or mutated may be predetermined or dynamically varied during operation of the evolutionary algorithm, according to an example embodiment of the invention. For example, a first predetermined portion or percentage (e.g., 50%-80%) of the received chromosomes of the chromosome data structures may have genes that are crossed over in block 408 while a second predetermined portion or percentage (e.g., 1%-3%) of the received chromosomes of the chromosome data structures may have genes that are mutated in block 410. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 408 and 410 may be available without departing from example embodiments of the invention. Likewise blocks 408 and 410 may be performed in a different order than that shown in FIG. 4 or otherwise combined into a single block without departing from example embodiments of the invention.

By applying one or more evolutionary operators to the chromosomes of the selected pairs of parent chromosome data structures, a new population of child chromosome data structures may be obtained in block 412. Following block 412, processing may proceed to block 414. In block 414, the new population of child chromosome data structures may be received into a "To Evaluate" list or queue (see also FIG. 5, which illustrates block 414 in further detail). Block 414 may then allocate the chromosome data structures from the "To Evaluate" list or queue to the plurality of slave processors 308 according to an asynchronous evolution process. An automated chromosome bundling process, discussed in further detail with respect to FIG. 5, may also be utilized in block 414 to determine how many chromosome data structures should be included in a respective chromosome bundle for a respective slave processor 308. For example, a slave processor 308 with faster processing capability may receive a chromosome bundle with a larger number of chromosome data structures. Alternatively, the slave processor 308 may receive a fixed number of chromosome data structures in a chromosome bundle, but simply receive a larger number of chromosome bundles within a predetermined amount of time. The example automated chromosome bundling process may allow efficient allocation of chromosome data structures among the plurality of slave processors 308.

In block 415, each slave processor 308 may have received a chromosome bundle comprising one or more chromosome data structures from the master processor 306. The slave processors 308 may be homogenous or heterogeneous in processing capability. Each slave processor 308 may evaluate, in accordance with a plurality of objective functions, the received chromosome bundle of chromosome data structures to generate a plurality of respective objective function values for each chromosome data structure in block 415. In addition, each slave processor 308 may also perform timing operations or calculations, including determination of certain wait times and/or evaluation times associated with the respective slave processor 308, in block 415. As each slave processor 308 finishes the objective function evaluations and/or timing operations in block 415, the slave processor 308 may provide a results bundle (e.g., objective function values) and timing data (e.g., wait times and/or objective function evaluation times) to the master processor 306. The master processor 308 may provide the received objective function values as well as an identification of the corresponding evaluated child chromosome data structures to a "Finished" list or queue. It will be appreciated that with asynchronous evolution processing, the objective function results may be included in the "Finished" list or queue on an as-received basis from the slave processor 308. Indeed, the evolutionary process is asynchronous in that as soon as the "To Evaluate" list is empty for a given generation/iteration 421, the processing taking place in block 414 is completed, where the child population passed to block 416 is comprised of all of the chromosome data structures currently within the "Finished" list. It will be further appreciated that the results from some of the chromosome bundles previously sent to the various slave processors 308 may not have been received at the time the "To Evaluate" list is emptied. These may be referred to as late chromosome data structures from one or more prior generations/iterations.

In block 416, the master processor 306 receives a modified child population of chromosome data structures from the asynchronous evolution process of block 414. The modified child population may include different chromosome structures as well as a different number of chromosome data structures as compared to the child population of block 412. The received modified child population is merged with the current parent population, as illustrated by block 416. In block 418, the master processor 306 may perform non-domination sorting (e.g., based off of an epsilon vector) of the merged list of child and parent chromosome data structures to identify an elite set of chromosome data structures based at least in part on the corresponding objective function values. According to an example embodiment, non-domination sorting may utilize the concept of domination to compare solutions provided by the merged list of child and parent chromosome data structures. A solution $x_1$ is said to dominate solution $x_2$ if both conditions 1 and 2 identified below are true:

Condition 1: The solution $x_1$ is no worse than $x_2$ in all objectives.

Condition 2: The solution $x_1$ is strictly better than $x_2$ in at least one objective.

If both conditions 1 and 2 are satisfied, then all of the following statements are substantially equivalent:

$x_2$ is dominated by $x_1$, $x_1$ is non-dominated by $x_2$, or $x_1$ is non-inferior to $x_2$.

Accordingly, non-domination sorting in block 418 may be performed to determine a set of chromosome data structures (e.g., designs) that are non-dominated with respect to other solutions when comparing the respective objective function values corresponding to the objective functions. For example, non-domination sorting may involve classifying the merged list of child and parent chromosome data structures into multiple fronts (for two objective functions), surfaces (for three objective functions), volume (for 4 objective functions), or hypervolumes (for 5+ objective functions) based off of their respective domination rank. In an example embodiment of the invention, domination ranking may proceed by first considering the entire merged list of child and parent chromosome data structures. The objective function values corresponding to the objective functions for each chromosome data structure are compared and the non-dominated solutions from the list are identified. These solutions are assigned a domination rank of 1 and removed from the merged list. The reduced merged list of child and parent chromosome data structures are then considered and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cuboid surrounding a solution in which no other solutions are present. The obtained elite set of chromosome data structures for the particular generation/iteration may be stored in the archive checkpoint 402 or another archive of a computer memory or other data storage for subsequent retrieval.

Following processing in block 418, processing may proceed to block 419. In block 419, a determination is made as to whether the current job is completed such that the evolutionary algorithm should be terminated. A job typically comprises processing involving a plurality of connected runs 422, where each run 422 may include processing associated with one or more generations/iterations 421. Block 419 may include, but is not limited to, termination based upon whether the search has failed to produce sufficient improvement in solutions over a predefined number of generations/iterations or whether a maximum number of function evaluations have been completed or a maximum time (e.g., based upon a wall clock time) has elapsed. For example, the evolutionary algorithm may terminate, according to sufficient improvement termination criterion, if a predetermined percentage (e.g., 90%) of the obtained solutions remain in the same epsilon rectangles, volumes, or hypervolumes/hyperrectangles for a prior number of generations (e.g., the last 20 generations), or alternatively, across a prior number of connected runs, in accordance with an example box fitness termination criteria (see, e.g., FIGS. 7A-7F). It will be appreciated that the obtained solutions comprising the chromosome data structures may be output in a variety of formats, including a database format, a comma separated value (CSV) format, or a graphical format.

If block 419 determines that the job is not complete, then processing may proceed to block 420 to determine whether the current run 422 has completed. In determining whether the current run is complete, block 420 may determine whether a current run 422 has failed to produce improvement in quantity and quality of the solutions generated from the prior iterations/generations 421. The quantity measure may be based upon the number of solutions. The quality measure may be based on some quantification of distance from a utopia point, box fitness (e.g., described with respect to FIGS. 7A-7F), or yet another measure.

If block 420 determines that a current run 422 is not complete, then processing may proceed to block 423, wherein a population of parent chromosome structures may be obtained or otherwise selected from the elite chromosome data structures determined from block 418. The prior process is then repeated for another generation/iteration 421 using the parent chromosome data structures from the prior generation/iteration. It will be appreciated that because the evolution process of block 414 is asynchronous, there may be one or more late child chromosome data structures received in the "Finished" list or queue in 416 that are associated with one or more pairs of parent chromosome data structures allocated to slave processors 308 during one or more prior generations/iterations. Therefore, in the next generation/iteration 421, the merged children chromosome data structures in block 416 may likewise include those late child chromosome data structures as well as current child chromosome data structures from parent chromosome data structures allocated to slave processors 308 during the current generation/iteration 421.

On the other hand, block 420 may determine that a current run 422 is complete. For example, looking back over a predetermined number of generations, the search may have failed to produce improvement in the solutions during each generation/iteration 421 of the current run 422. Improvement may be based upon the quantity of the solutions (e.g., the number of solutions) and the quality of the solutions (e.g., some quantification of distance from a utopia point, box fitness, etc.). In this case, the current run 422 is completed, and processing proceeds to initiate a subsequent run 422. The subsequent run 422 may generate an initial population by invigorating the elite solutions stored in the archive checkpoint 402. In particular, the subsequent run 422 may utilize a first number of the elite solutions from the archive checkpoint 402 as part of the initial population utilized in block 404, but may also invigorate the initial population by adding a second number of randomly generated parent chromosome data structures. The randomly generated parent chromosome data structures may be generated and evaluated using the example processes discussed with respect to blocks 404 and 414.

B. Asynchronous Evolution and Automated Chromosome Bundling

Figure 5:
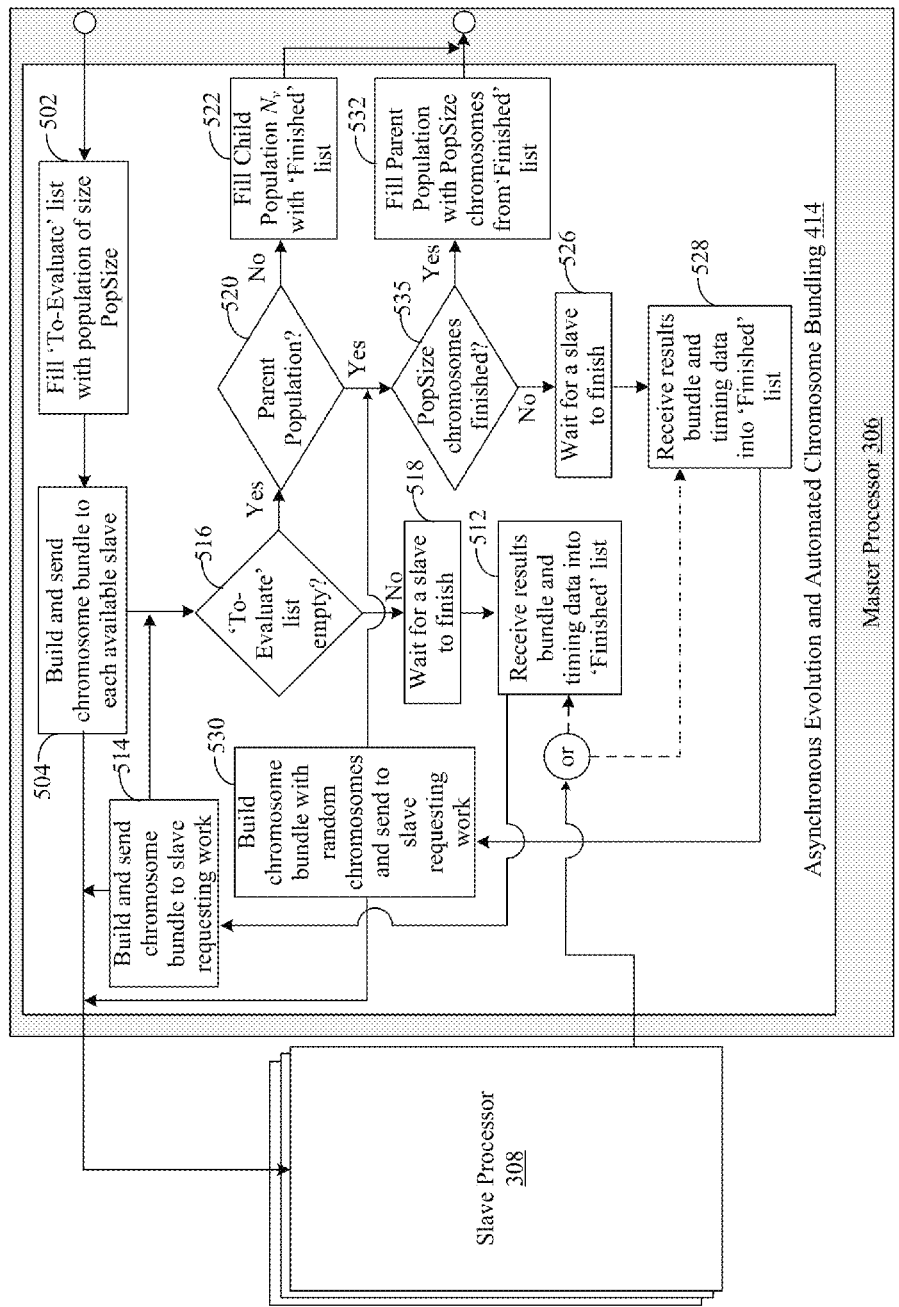
FIG. 5 illustrates an example flow diagram for an asynchronous evolution and automated chromosome bundling process, in accordance with example embodiment of the disclosure.

FIG. 5 illustrates an example implementation of an asynchronous evolution and automated chromosome bundling process that may be utilized for block 414 of FIG. 4. It will be appreciated that the example asynchronous evolution and automated chromosome bundling process of FIG. 5 is provided by way of example only, and that many variations are available without departing from example embodiments of the invention.

The asynchronous evolution and automated chromosome bundling process can be utilized in conjunction with at least two example scenarios: (i) evaluation of a randomly generated initial population (e.g., block 404 of FIG. 4) or (ii) evaluation of a new child population (e.g., block 412 of FIG. 4).

Turning now to FIG. 5, the process begins with block 502 in which a "To Evaluate" list or queue is filled with either (i) the randomly generated input population of parent chromosome data structures from block 404, or (ii) the new child population of chromosome data structures from block 412.

In block 504, the master processor 306 allocates the chromosome data structures from the "To-Evaluate" list or queue to some or all of the plurality of slave processors 308. More specifically, in block 504, the master processor 306 may build a chromosome bundle for each available slave processor 308 that is to receive work. It will be appreciated that some slave processors 308 may be busy processing chromosome bundles from previous generations/iterations. The number of chromosome data structures included within each chromosome bundle may be determined by the master processor 306 using an example bundling calibration algorithm, which will now be described in further detail.

In an example embodiment of the invention, an example chromosome bundling calibration algorithm may utilize the following tuning knobs or tuning parameters, which may be set, predetermined, or adjusted by a user:

Time_to_Process_Chrom_Bundle_Theshold: A threshold time to process the chromosome bundle (e.g., 10 minutes). This threshold time may provide a target for how many chromosome data structures to include in a chromosome bundle such that the processing time during function evaluation reaches at least this threshold time.

Number_of_Chromosome_Bundles_Needed_for_Rolling_Average: Provides the number of chromosome bundles (e.g, 25) (each having a certain number of chromosome data structures) that each slave processor will process to achieve an acceptable rolling average. The rolling average refers to the total time that the average timing data is collected over.

In addition, each slave processor 308 may maintain the following timing data:

Rolling_Average_Wait_Time: An amount of time that a slave processor spends waiting for work from a master processor.

Average_Function_Evaluation_Time: A cumulative average time required by a slave processor to process or evaluate a single chromosome data structure.

In an example embodiment of the invention, a goal of the example bundling calibration algorithm in block 504 may be to help keep the slave processors 308 at a fairly high (e.g., nearly 100%) utilization rate. Increasing the bundle size decreases the number of packets sent across the network and helps to minimize the time the slave processors 308 are waiting for work. However, if the bundle size is too large, a lag or delay may result in which a chromosome data structure may be potentially outdated by the evolutionary progress. The equilibrium bundle size may be dependent on the function evaluation times of the slave processors 308 and the network capability.

The bundling calibration algorithm may be performed by the master processor 306 for each slave processor 308. In an example embodiment of the invention, the bundling calibration algorithm may be performed for each slave processor 308 based upon the occurrence of one or more of the following conditions: (i) a sufficient number of chromosome data structures have already been processed and calibration has yet to occur, (ii) the rolling average wait time for a slave processor has changed by a threshold amount (e.g., >10%), and/or (iii) the number of slave processors 308 being managed by the master processor 306 has changed.

In an example embodiment of the invention, the bundling calibration algorithm may be implemented as follows in Table I. It will be appreciated that variations of the algorithm in Table I are available without departing from example embodiments of the invention.

TABLE I

Bundling Calibration Algorithm

When (Average_Function_Evaluation_Time >
    Time_to_Process_Chrom_Bundle_Theshold),
    set Bundle_Size = 1.
If (Bundle_Size * Average_Function_Evaluation_Time) >
    Time_to_Process_Chrom_Bundle_Theshold),
    then reduce Bundle_Size by 1, and
    monitor the benefit of the reduced Bundle_Size
    (If Rolling_Average_Wait_Time
    has not increased, then keep new Bundle_Size; Otherwise,
    keep the prior Bundle_Size);
Else (Bundle_Size is less than threshold), then set Bundle_Size =
    (Time_to_Process_Chrom_Bundle_Theshold /
    Average_Function_Evaluation_Time); monitor the benefit
    (wait until the number of chromosome data structures
    needed to calculate the
Rolling_Average_Wait_Time has been processed); and register or store
    the new Bundle_Size and new Rolling_Average_Wait_Time.

The chromosome bundles generated in block 504 may be allocated to the slave processors 308. Each slave processor 308 may evaluate, in accordance with a plurality of objective functions, the received chromosome bundle of chromosome data structures to generate a plurality of respective objective function values for each chromosome data structure. In addition, each slave processor 308 may also perform timing operations or calculations, including a determination of the Rolling_Average_Wait_Time and Average_Function_Evaluation_Time associated with the respective slave processor 308. As each slave processor 308 finishes the objective function evaluations and/or timing operations in block 415, the slave processor 308 may provide a results bundle (e.g., objective function values) and timing data to the master processor 306. The results bundle and timing data may be received in the "Finished" list or queue in block 512 or block 528, depending on the states of blocks 516, 520, and 524.

In particular, if the "To-Evaluate" list or queue is not empty (block 516), then the master processor 306 may wait for one or more slave processor 308 to finish, and the results bundle and timing data may be received into the "Finished" list or queue in block 512. Processing may then proceed from block 512 to block 514, where additional chromosome data structures from the "To-Evaluate" list or queue may be allocated in one or more chromosome bundles to one or more slave processors 308 that have previously finished processing and are waiting for additional work.

Once the "To-Evaluate" list or queue is empty, processing may proceed to block 520 to determine whether a parent population is being evaluated. If not, then the "Finished List" may be filled with the evaluated child population of chromosome data structures in block 522. On the other hand, if the parent population is being evaluated, then processing may proceed to block 524 to determine whether a predetermined population size (PopSize) has been evaluated. If so, then processing proceeds to block 532, where the "Finished List" may be filled with the evaluated parent population of chromosome data structures. On the other hand, block 524 may determine that less than the predetermined population size has been evaluated, and processing may proceed to block 526 to wait for one or more slave processors 308 to finish. Following block 526, processing may proceed to block 528 where the results bundle and timing data may be received from the just finishing slave processors 308 into the "Finished" list or queue. Processing may then proceed to block 530, where additional chromosome data structures are randomly generated and allocated in one or more chromosome bundles to one or more slave processors 308 for objective function evaluation.

In an example embodiment of the invention, block 530 may be utilized to keep available slave processors 308 working with randomly generated chromosome data structures until the predetermined parent population size has been reached. The modified parent population must have the prerequisite number of chromosome data structures, and some of the randomly generated chromosomes may complete processing prior to the chromosome data structures originating from the parent population; in this situation they will become part of the modified parent population, which is received back to block 514. The remaining randomly generated chromosomes will eventually complete and become part of a subsequent modified child population. Block 530 may improve efficiency by keeping slave processors 308 more fully employed, according to an example embodiment of the invention.

It will be appreciated that many variations of the FIG. 5 are available without departing from example embodiments of the invention.

C. Slave Processor Evaluation and Timing Operations

Figure 6:
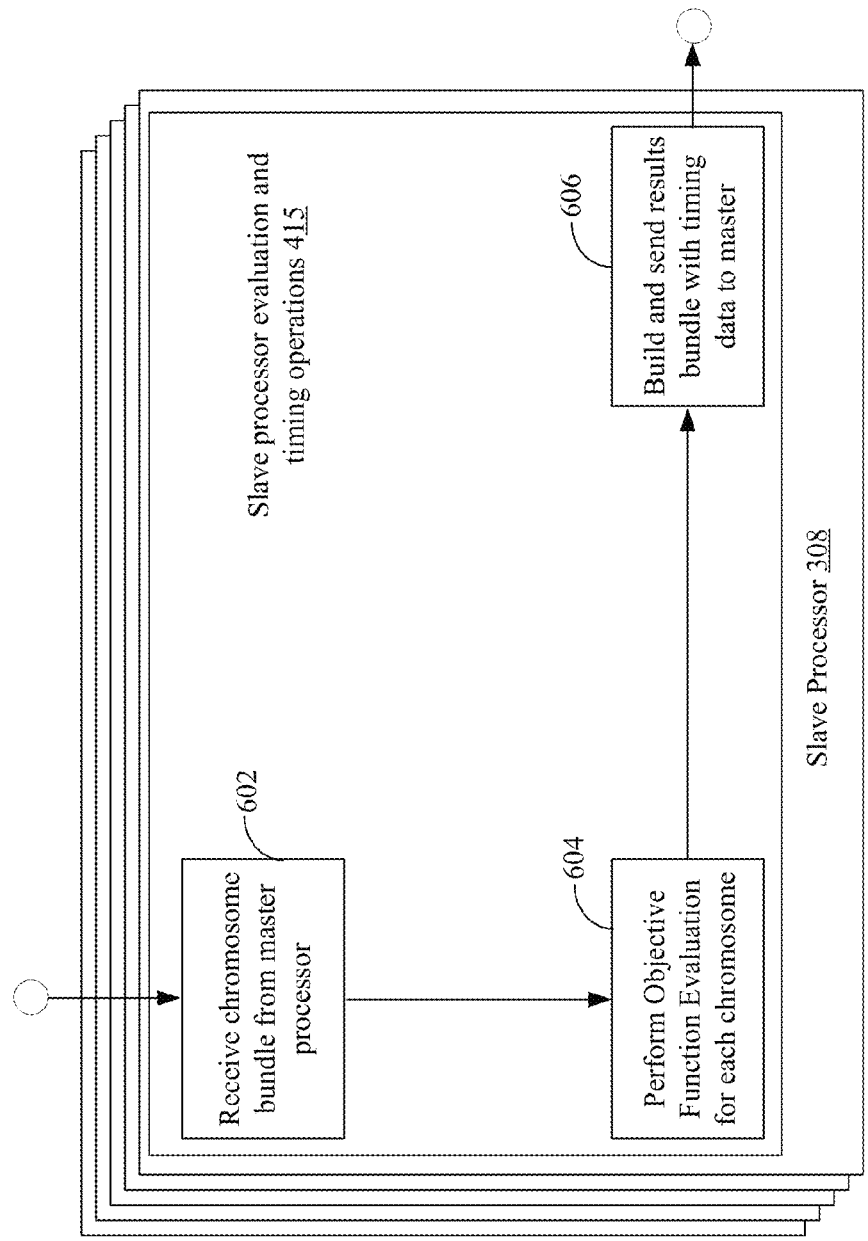
FIG. 6 illustrates example flow diagram for slave processor and timing operations, in accordance with example embodiments of the disclosure.

FIG. 6 illustrates example slave processor and timing operations that may be utilized for block 415 of FIG. 4, according to an example embodiment of the invention. It will be appreciated that the example slave processor and timing operations of FIG. 6 are provided by way of example only, and that many variations are available without departing from example embodiments of the invention.

Referring now to FIG. 6, in block 602, a slave processor 308 may receive a chromosome bundle having one or more chromosome data structures from the master processor 306. In block 604, the slave processor 308 may perform objective function evaluation for each chromosome data structure in the chromosome bundle. In an example embodiment of the invention, the slave processor 308 may perform objective function evaluation by applying a plurality of objective functions to each chromosome data structure. The slave processor 308 may access the objective functions from a local memory or database, or may otherwise access the objective functions from a network memory or database. It will be appreciated that the objective function as evaluated for each chromosome data structure may be based, at least in part on the estimates of the value of the candidate projects 110 by a particular stake holder 120. In block 606, the slave processor 308 may also calculate or maintain timing data, such as wait times and/or objective function evaluation times described herein. The slave processor 308 may build and send the results bundle with the timing data to the master processor 306.

III. Box Fitness Termination Criteria

The termination criteria described in block 419 of FIG. 4 will now be described in further detail. In an example embodiment of the invention, the termination criteria may be based upon box fitness, as described herein.

As described above, the master processor 306 may have allocated a population of chromosome data structures to the slave processors 308 in respective chromosome bundles for evaluation. The slave processors 308 may evaluate the chromosome data structures according to at least two objective functions $f_1$ and $f_2$. Accordingly, each chromosome data structure may be associated with at least a respective first objective function value and a second objective function value corresponding to the objective functions $f_1$ and $f_2$.

Initially, a first non-domination sorting may be applied to the current population to remove solutions that are dominated by at least one other solution (see, e.g., FIG. 7A, discussed below). It will be appreciated that a solution is non-dominated by another solution because it is strictly better in at least one objective function (determined by comparing the objective function values) and no worse than the eliminated solution with respect to the remaining objective functions (determined by comparing the objective function values).

Following the first non-domination sorting, epsilon non-domination sorting may be applied to the remaining solutions in the current population (see, e.g., FIG. 7B, discussed below). Epsilon non-domination sorting may include plotting or mapping the remaining solutions to a first epsilon value for objective function $f_1$ and a second epsilon value for objective function $f_2$, according to an example embodiment of the invention. The first epsilon value may be associated with a first epsilon spacing or step size $\epsilon_1$ associated with objective function $f_1$, and a second epsilon value may be associated with second epsilon spacing or step size $\epsilon_2$ associated with objective function $f_2$. Each solution may then be associated with an epsilon vector or epsilon box address ($\epsilon_1$, $\epsilon_2$) corresponding to the first epsilon value and the second epsilon value. If two or more solutions have the same epsilon box address, then the epsilon non-domination sorting may retain a single solution per epsilon box address ($\epsilon_1$, $\epsilon_2$). This solution may be determined based upon whether objective functions $f_1$ and $f_2$ are being minimized or maximized, according to an example embodiment of the invention. It will be appreciated that while only two objective functions are described herein, other example embodiments may utilize more than two objective functions without departing from example embodiments of the invention.

In an example embodiment of the invention, a box fitness termination criteria may have two components. First, looking back over a predetermined number of previous generations/iterations, the total quantity of unique epsilon box addresses must remain unchanged above a predefined threshold (e.g., 90% or another user-defined percentage). Second, the greater-than-or-equal-to threshold must be maintained for a predefined number of generations/iterations. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage). If this occurs, then a counter utilized for the second component may be reset such that the evolutionary algorithm continues with additional generations/iterations until the box-fitness percentage change has held above the predefined threshold for the predefined number of sequential generations.

An example box fitness termination criteria will be described more particularly with respect to FIGS. 7A-7F. FIG. 7A illustrates a feasible design region 702 associated with a first objective function $f_1$ and a second objective function $f_2$. Within the feasible design region is a snapshot of a population of solutions (e.g., at block 416) of a given generation/iteration, according to an example embodiment of the invention. Based upon the goal of minimizing the first and second objective functions $f_1$ and $f_2$, non-domination sorting (e.g., at block 418) identifies all of the circles as being non-dominated solutions and all of the triangles as dominated solutions. The dominated solutions may be eliminated from the population or removed from further consideration, according to an example embodiment of the invention.

Figure 7A:
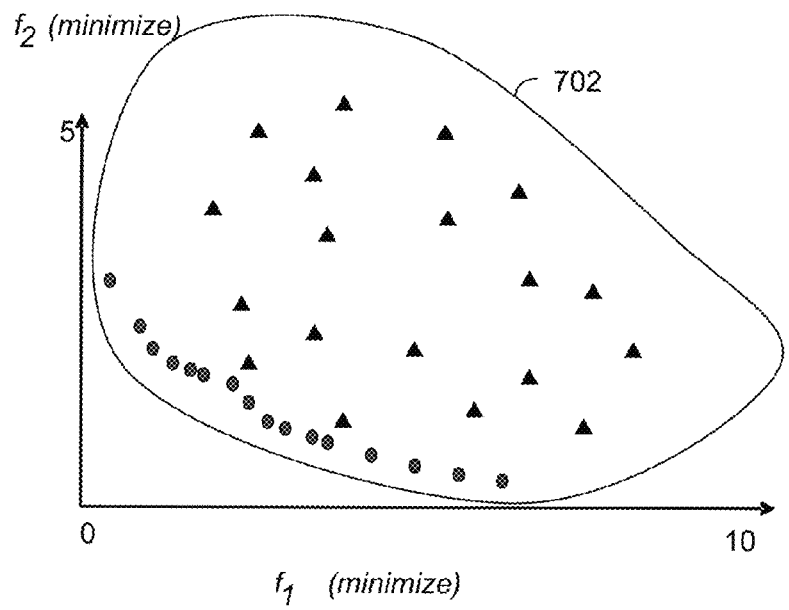
FIGS. 7A-7F illustrate visual representations of an operation of box fitness termination criteria, in accordance with example embodiments of the disclosure.
Figure 7B:
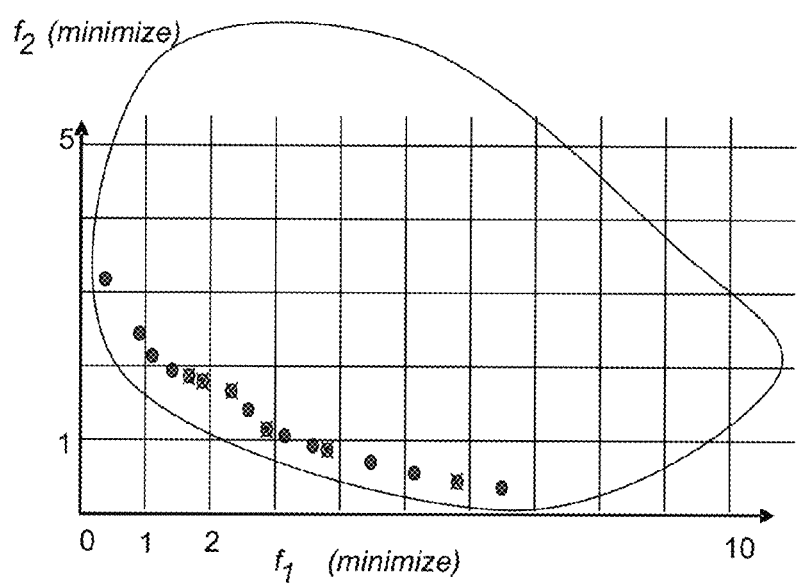

In FIG. 7B, epsilon non-domination sorting may be applied to the remaining solutions (e.g., non-eliminated solutions) from the first non-domination sorting of FIG. 7A. An epsilon spacing or step size can be defined for objective functions $f_1$ and $f_2$ to generate an epsilon grid in the objective space, where following epsilon non-domination sorting, only one solution exists in each block/box of the grid defined by an epsilon box address. In FIG. 7B, the epsilon non-dominated solutions are illustrated by circles, while the epsilon dominated (inferior) solutions are illustrated by the crossed-out circles. Because both of objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of objective functions $f_1$ and $f_2$ could also be maximized as well without departing from example embodiments of the invention.

Figure 7C:
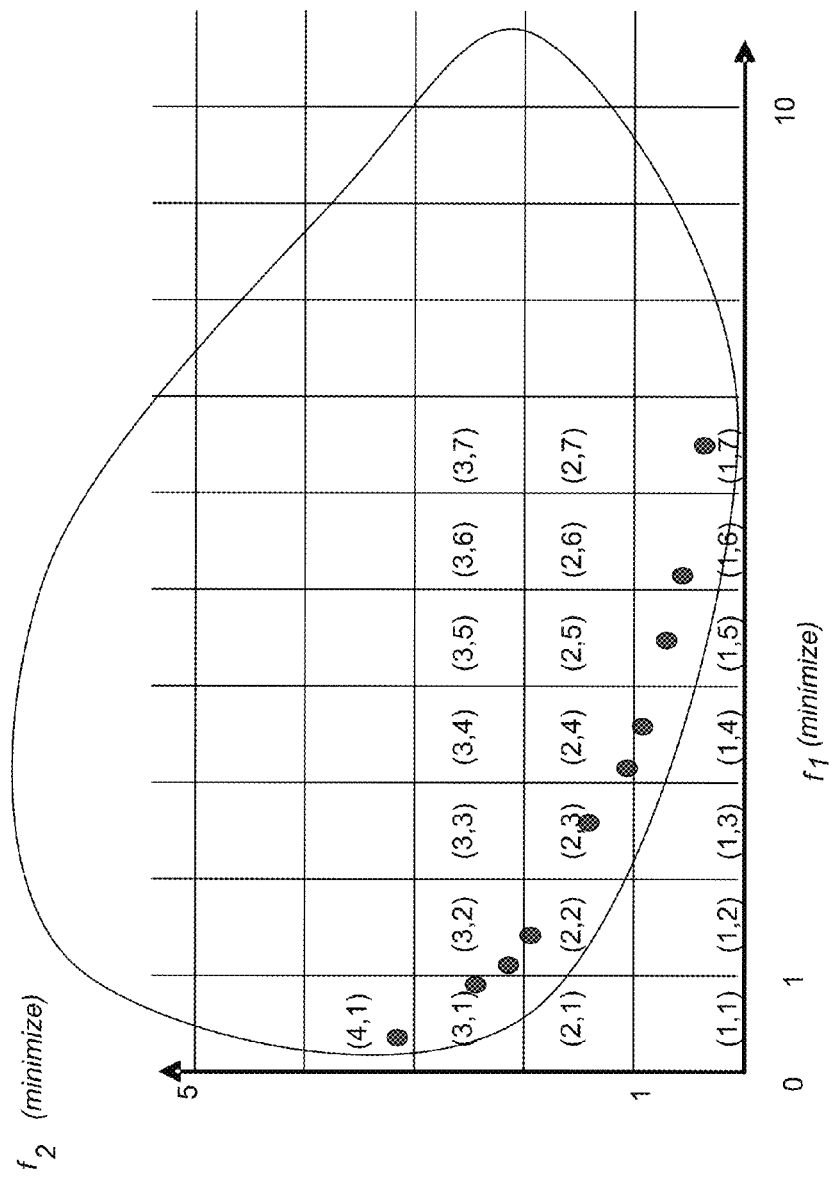

In FIG. 7C, the epsilon non-dominated solutions are illustrated. Each of these solutions has an epsilon box address as shown by FIG. 7C. Each solution inside a given box has a fitness based upon its domination rank and diversity, as described herein in accordance with an example embodiment of the invention. Since only one solution can exist in any given box during a generation/iteration (e.g., box 421), one can count how many boxes remain unchanged from iteration to iteration.

Figure 7D:
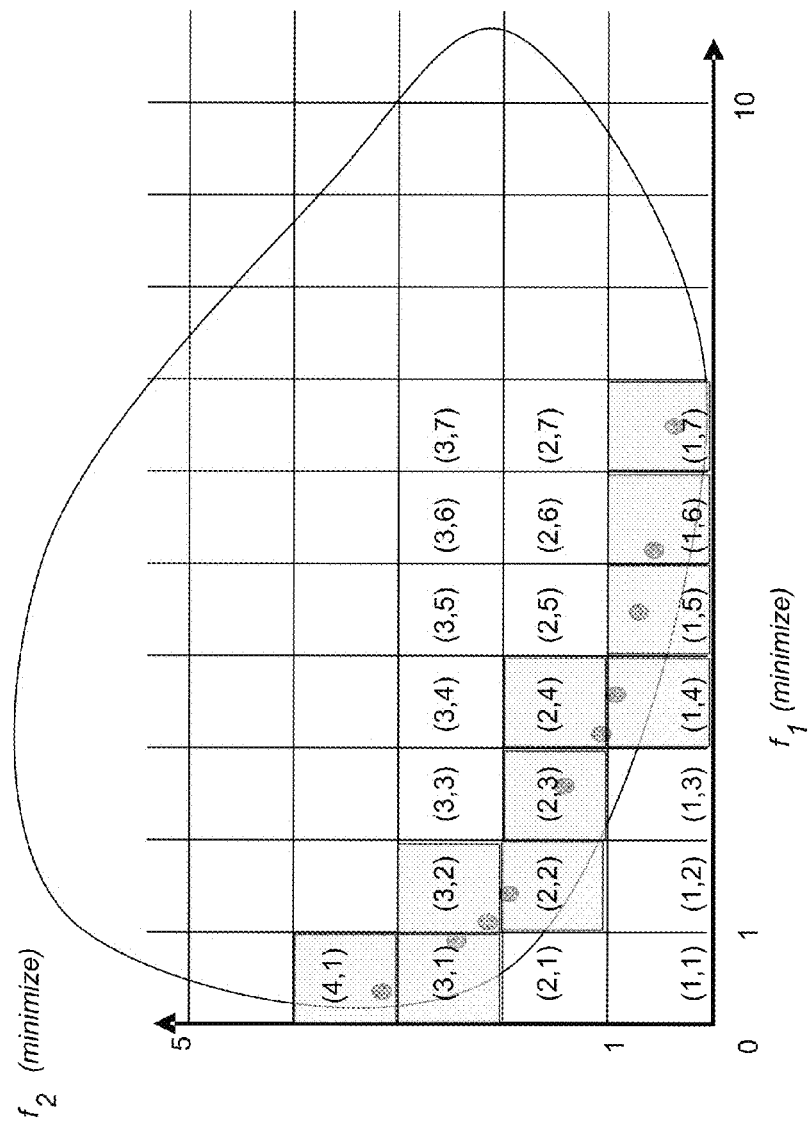

In FIG. 7D, the number of unique boxes for a particular generation/iteration (e.g., box 421) is illustrated. In particular, in FIG. 7D, there are 10 unique boxes corresponding to the addresses of: (4,1), (3,1), (3,2), (2,2), (2,3), (2,4), (1,4), (1,5), (1,6), and (1,7). The addresses for each unique box may be stored in a memory or archive for the purposes of comparison to future generations.

Recall that the box fitness termination criteria may operate as follows: (1) Looking back over a predetermined number of previous generations/iterations (e.g., block 421), the total quantity of unique box addresses must remain unchanged above a threshold (e.g., 90%), (2) This greater-than-or-equal-to threshold must be maintained for a pre-defined number of generations/iterations (e.g., 20 generations/iterations), and (3) If both of these conditions are met, then the job is terminated.

Figure 7E:
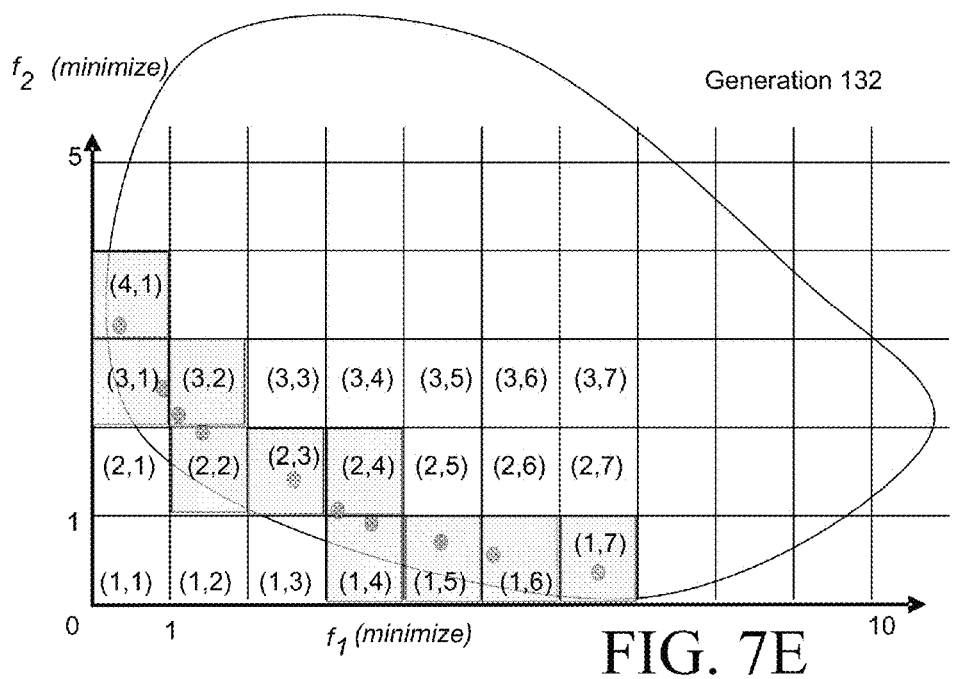
Figure 7F:
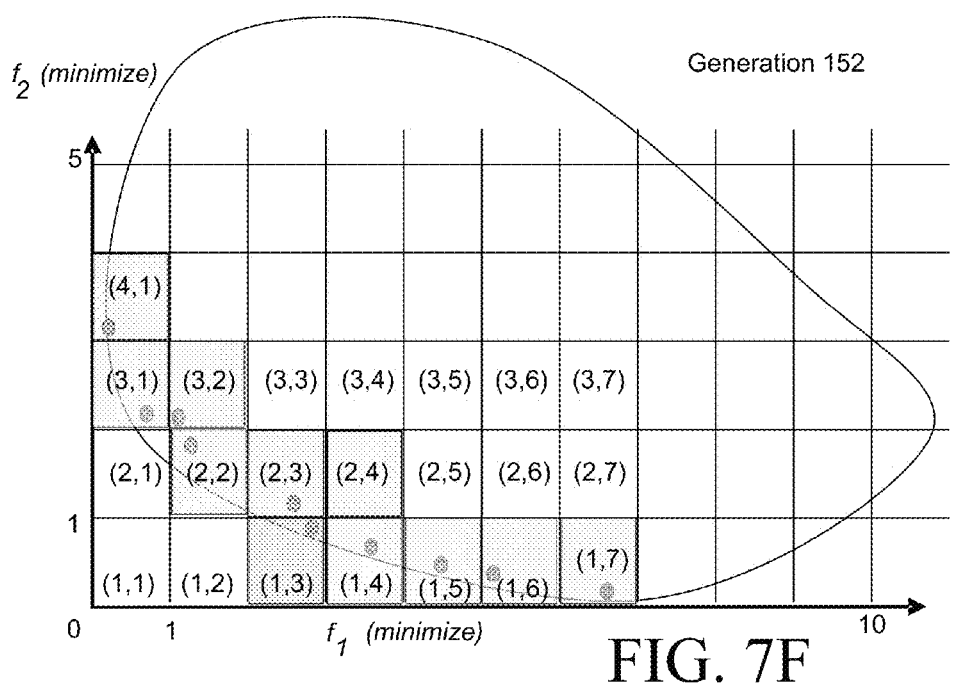

FIG. 7E illustrates a snapshot of a mostly converged population of epsilon non-dominated solutions at a particular generation/iteration such as generation #132. FIG. 7F illustrates a snapshot of the population of non-dominated solutions at a subsequent generation/iteration such as generation #152. As compared to FIG. 7E, one of the solutions in FIG. 7F has moved closer to the Pareto-optimal front, but the remaining solutions have not materially improved with regard to their box addresses. Note one new epsilon box address of (1,3) has been found in FIG. 7F as compared to FIG. 7E. However, this represents a 90% unchanged population between FIGS. 7E and 7F with respect to unique box addresses, which has remained above this threshold for the predetermined number of consecutive generations/iterations (e.g., last 20 consecutive generations/iterations), so this job can be terminated.

It will be appreciated that while the box fitness criteria has been illustrated with respect to two objective functions, the box fitness can be applied where there are three or more objective functions without departing from example embodiments of the invention. Indeed, the box-fitness termination criteria can be generalized to n-objectives/dimensions, where 3 objectives/dimensions may be represented by volumes, and 4+ objectives/dimensions can be represented by hypervolumes.

In addition, it will be appreciated that the epsilon spacings or step sizes discussed herein may be varied in accordance with an example embodiment of the invention. For example, a larger epsilon spacing or step size may decrease the number of generations/iterations that are needed before the box-fitness termination criteria is met and a job is terminated. On the other hand, a smaller epsilon spacing or step size may increase the number of generations/iterations that are needed before the box-fitness termination criteria is met and the job is terminated.

It will also be appreciated that the epsilon spacing or step size of the epsilon vector can also be dynamically adjusted or changed. An example method for dynamically changing the epsilon vector will now be discussed in further detail. Suppose, for example, that there is a 10-dimensional optimization problem in which there are 10 objectives:

For each objective, the decision maker (problem stakeholder) may decide, a priori, how many epsilon non-dominated solutions are desired for each objective. For example, perhaps 10 solutions for the first objective/dimension, 20 for the second objective/dimension, etc.

For each objective, at some predetermined interval, which may or may not be as frequently as the end of a given generation/iteration:

Calculate the maximum and minimum objective values and scale between 0 and 1. If the user wanted 10 solutions, for example, then we would desire one solution to fall with the slice between 0 and 0.1, one between 0.1 and 0.2, etc.

For each of these slices, calculate the number of epsilon non-dominated solutions.

Then calculate the average number across all slices. If this average is greater than 1, then increase the epsilon value (e.g., epsilon spacing or step size) for that objective dimension according to 3) below. On the other hand, if this average is less than 1, then decrease the epsilon value (e.g., epsilon spacing or step size) for that dimension according to 3) below.

Adjust the epsilon value (e.g., epsilon spacing or step size) for the next iteration by multiplying the average number of epsilon non-dominated solutions per slice for that objective by the current epsilon value. If the average rate is greater than 1, then the new epsilon value will encourage the set to shrink in that dimension. If, the average is less than 1, then the new epsilon value will encourage the set to grow in that dimension objective.

Over time, using the process described in steps 2-3 will result in an epsilon vector that oscillates in all dimensions around a "mean" vector or steady-state value. For computational efficiency, all epsilon non-dominated solutions found during a given job will be stored off-line and potentially added back into the population after a new epsilon vector is determined. This mechanism ensures that previously epsilon non-dominated solutions are not lost as the dynamic epsilon vector elements are reduced or increased in size at the predetermined frequency.

Figure 8:
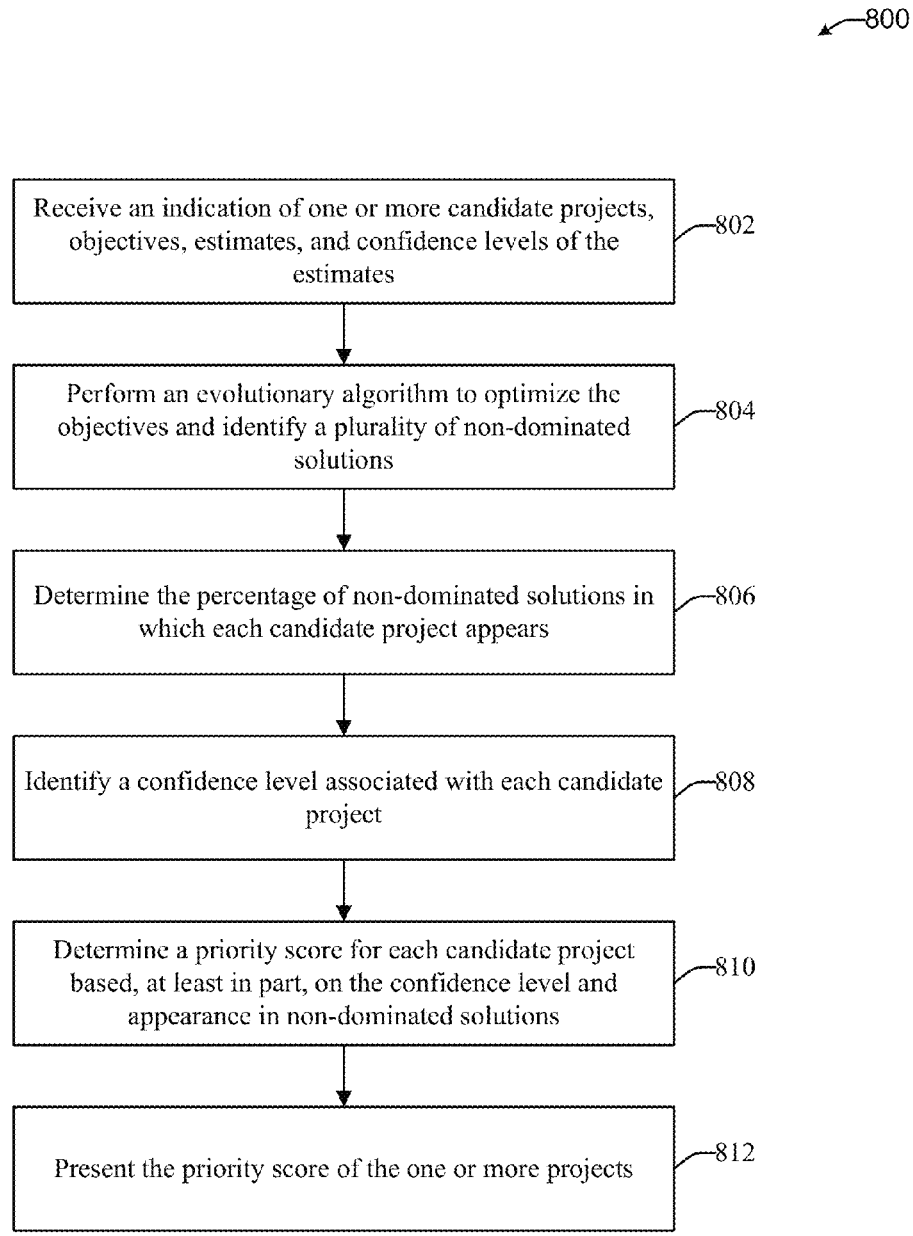
FIG. 8 illustrates an example flow diagram generating a priority score associated with a candidate project, according to an example embodiment of the disclosure.

Referring now to FIG. 8, a flow diagram depicting an example method 800 for generating priority scores associated with candidate projects 110, according to an example embodiment of the disclosure. The method 800 may be performed by the project funding system 150 and one or more processors thereon. Alternatively, the method may be performed by any variety of hardware, software, or combinations thereof, as depicted herein. The method 800 may further be performed based, at least in part, on information and/or estimates provided to the project funding system 150, such as by input from one or more stake holders 120.

At block 802, indication of one or more projects, goals, estimates, and confidence levels of the estimates may be received. As discussed above, the confidence levels of the estimates may be optional, and in some embodiments, the confidence level of the estimates may not be received by the project funding system 150, but derived by the project funding system 150. In certain embodiments, an indication of a complete set of candidate projects 110 may be received, such as by user input or data file. It will be appreciated that, in some cases, the candidate projects 110 may be organized in hierarchies, such as projects and sub-projects. In certain embodiments, the goals may be goals and/or objectives associated with the organization where the candidate projects 110 are proposed. Further still, in certain embodiments, the estimates may be received as a plurality of sets of estimates. As a non-limiting example, each set may be associated with a particular stake holder 120. In other words, all or a subset of the stake holders 120 may provide estimates and/or projections associated with some or all of the candidate projects 110. The estimates from each of the stake holders 120 may be received by the project funding system 150 as a separate set of estimates.

At block 804, evolutionary algorithm may be performed to optimize the objectives as received at block 802. The evolutionary algorithm may be performed by the evolutionary algorithm system 240 as described in FIGS. 2-4 or other suitable entities that may perform evolutionary algorithms. Although the entities that perform the evolutionary algorithms, such as the evolutionary algorithm system 240 is depicted as part of the project funding system 150, it will be appreciated that in certain embodiments, the project funding system 150 and the evolutionary algorithm system 240 may be separate entities that may be communicatively linked, such as via a communications link and/or network.

The evolutionary algorithm may be performed multiple times, such as a predetermined number of times for each received set of estimates. As a non-limiting example, the evolutionary algorithm may be performed once for every set of estimates received from the stake holders 120. The estimates received in each set of estimates from each of the stake holders 120 may be used in performing each corresponding respective evolutionary algorithm. Each run of the evolutionary algorithm may generate at least on non-dominated solution. Therefore, in some case, the number of non-dominated solutions generated may be equal to the number of sets of estimates received. Alternatively, one or more of the sets of estimates associated with the candidate projects 110, when applied to the evolutionary algorithm, may provide more than one non-dominated solution. If this occurs, then in some cases only one of the non-dominated solutions may be selected from the two or more non-dominated solutions, such as by uniform selection between the non-dominated solutions. Alternatively, the complete set of non-dominated solutions may be used for project funding selection.

At block 806, a percentage of non-dominated solutions in which each project appears may be determined. As a non-limiting example, consider that at the process of block 804, 100 non-dominated solutions are identified. Consider further that a particular project appears in 63 of those 100 non-dominated solutions. In this case, the percentage appearance in non-dominated solutions (P) 198 of that particular candidate project 110 may be 63%.

At block 808, a confidence level associated with each candidate project may be determined. As discussed above, the confidence level (C) 194 of the estimates of each of the projects, may in some cases, be based, at least in part, on confidence levels 140 associated with the estimates by the stake holders for the candidate projects 110, as received from the stake holders 120. In other cases, the confidence level 194 of the estimates of each of the projects may be determined based on the estimates provided by the stake holders 120. In certain embodiments, the confidence level (C) 194 of a project may be related to the level of variation between the estimates 130 received from the stake holders 120. In these cases, the due diligence resource allocation and/or funding system 150 may not receive any confidence levels 140 associated with the estimates by the stake holders 120. This type of variation may be determined by calculating a variance, standard deviation, or other suitable measure of variation, on the received estimates of a particular candidate project 110.

At block 810, a priority score may be determined for each of the candidate projects based, at least in part, on the confidence level (C) 194 of the estimates of each of the projects and the percentage appearance in non-dominated solutions (P) 198 of each of the candidate projects. In certain embodiments, the priority score may be calculated as Priority=(1−C)P. As a non-limiting example, consider that a particular project appears in 70% of the non-dominated solutions (P=70%) and that the confidence level of the estimates associated with the project is 60% (C=60%). In this case, this particular project may have a priority score of (1−60%)(70%)=28%. It will be appreciated that candidate projects that are more prevalent in the non-dominated solutions of the optimization problems based on estimates received from a variety of stake holders 120 are likely to have a greater priority score. Similarly, the projects that have a lower confidence level (C) are likely to have a greater priority score. It will be appreciated that after priority scores are determined for each of the candidate projects, the candidate projects may be ranked, such as in descending order of priority scores, for the purpose of informing the allocation of due diligence resources and/or funding.

At block 812, the priority scores may be presented for the one or more projects. The presentation may be via one or more input/output devices, such as a monitor, touch screen, or the like. The priority score, in certain embodiments, may be presented in order, such as descending order to the one or more stake holders 120. The presentation may also show a cut-off funding level and those projects with the highest priority scores that may be funded demarcated from those projects with lower priority scores that may not be receive additional due diligence resources and/or funding.

It should be noted, that the method 800 may be modified in various ways in accordance with certain embodiments of the disclosure. For example, one or more operations of method 800 may be eliminated or executed out of order in other embodiments of the disclosure. Additionally, other operations may be added to method 800 in accordance with other embodiments of the disclosure.

FIGS. 9A, 9B, and 9C are charts that depict an example prioritization of candidate projects for due diligence resources and/or funding, displaying the percentage appearance (P) in non-dominated solutions of an evolutionary algorithm, the confidence level of estimated project values (C), and the calculated priority score, respectively. In the charts, each of the columns (PE1 . . . PE9) represent particular projects and the rows (0 . . . 5) represent subprojects. It will be noted that each of these projects and sub-projects, as depicted in FIGS. 9A, 9B, and 9C, may be individual project options and/or actions to be taken on projects. For example, in certain embodiments, the projects (PE1 . . . PE9) may represent pre-existing and/or proposed projects and the sub-projects (0 . . . 5) associated with each project may represent development options and/or actions, such as to terminate the project, reduce or increase the funding for the project, modify the design or development strategy for the project, etc.

In this example, the projects may represent a variety of military space projects and various sub-projects thereunder. The total number of non-dominated solutions, in this case, may be 69 and the percentage of each of the projects in the 69 total different non-dominated solutions are shown in FIG. 9A. It can be seen that certain of the project-subprojects have a relatively high percentage of inclusion in the total of 69 non-dominated solutions, such as PE6-1 at 77% or PE9-0 at 58%. It should be noted again, that the non-dominated solutions may be based on optimizing multiple objective functions related to goals of the organization by the evolutionary algorithm system 240 using estimates of metrics associated with the goals and provided by the stakeholders 120. Indeed, each stakeholder 120 may provide a particular set of estimates and/or projections of the metrics associated with the candidate projects 110. Therefore, at least one non-dominated solution may be generated corresponding to each set of estimates, as provided by the stake holders 120.

In FIG. 9B, it can further be seen that several of the project-subprojects may have a relatively low confidence level (C) associated with current estimates and/or projections of metrics of the project, such as with PE3-2 at 10% or PE5-1 at 20%. The confidence level (C) 194 associated with the candidate projects may be based, in some embodiments, at least in part, on confidence levels 140 of the estimates provided to the project funding system 150 by the stake holders 120. In some cases, the project confidence level (C) 194 may be an aggregate, such as an average or other combination, of the confidence levels 140 of one or more estimates of metrics of that project from a variety of stake holders 120, as received by the project funding system 150. This determination may be performed by the confidence level manager component 250 of the project funding system 150. In other embodiments, the project funding system 150 may not receive confidence levels 140 associated with estimates of metrics of the candidate projects 110. In these cases, the project funding system 150 and the confidence level manager 250 thereon may determine the confidence level 194 of the estimates of the candidate project based on a measure of variation of the estimates. For example, the confidence level 194 may be calculated based on the variance of the estimates 130 received for a particular candidate project.

FIG. 9C is the calculation of (1−C)(P). It is observed, therefore, that those project—subprojects with a relatively low C and a relatively high P displayed a relatively high priority score, such as PE2-3 at 53, PE8-3 also at 53, and PE5-1 at 48. These candidate projects 110 may be particularly well suited for additional allocation of due diligence resources and/or funding to increase the confidence in the assumptions for these projects, to minimize the expected regret and/or buyer's remorse associated with funding these projects. In certain embodiments, the organization with which these projects 110 are affiliated may allocate due diligence resources and/or funding to the projects 110 in descending order of priority score, until the available due diligence resources are depleted.

Figure 10:
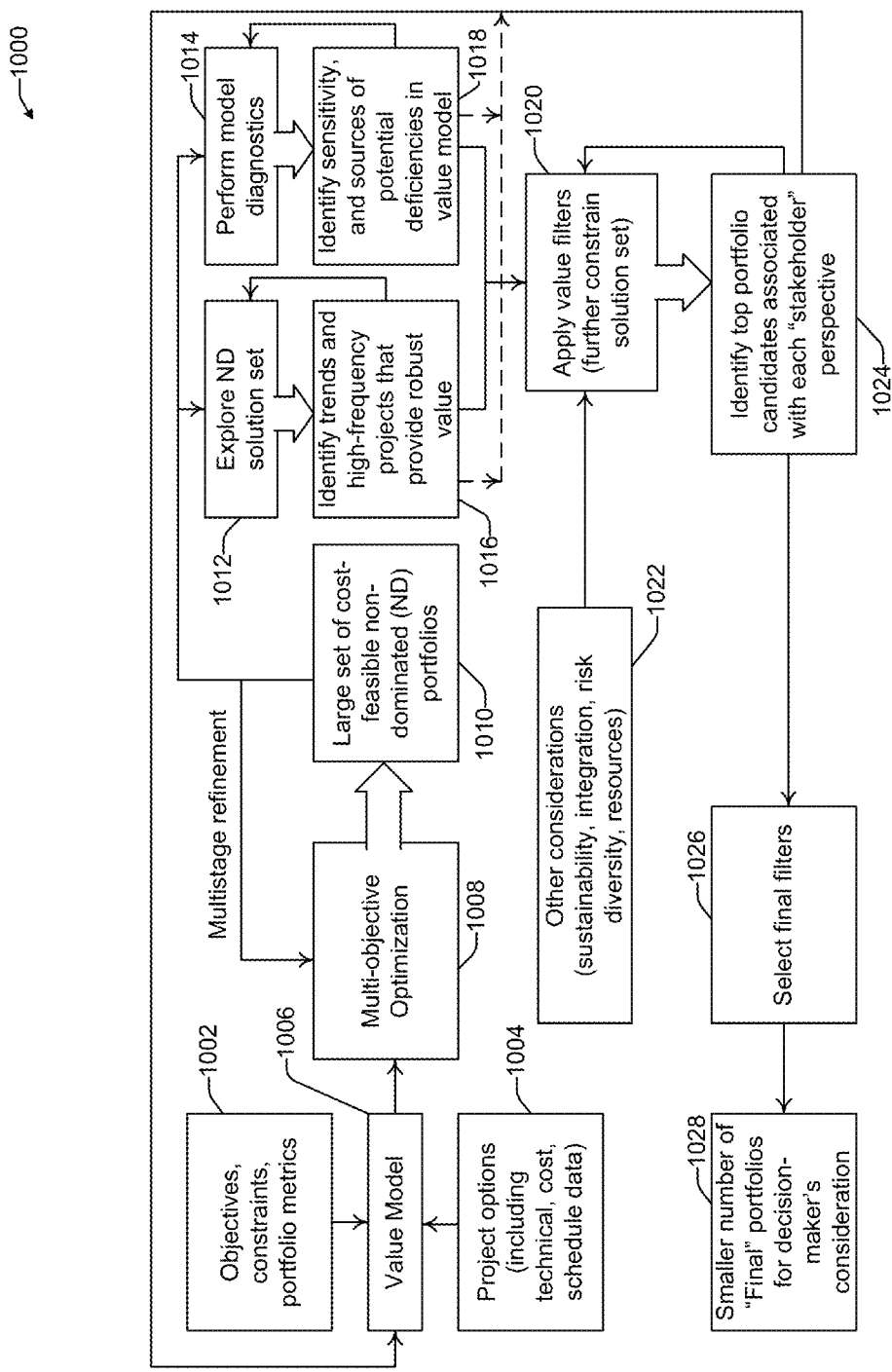
FIG. 10 illustrates an example flow diagram of an iterative method for prioritizing funding of projects, in accordance with example embodiments of the disclosure.

FIG. 10 illustrates an example of a general flow diagram of an iterative method 10000 for prioritizing funding of projects, in accordance with example embodiments of the disclosure. Objectives, constraints and portfolio metrics may be received at block 1002. Project options, such as technical benefits, costs, and schedule information may be provided at 1004. At block 1006, a value model may be generated based, at least in part, on the inputs provide at blocks 1002 and 1004. At block 1008, multi-objective optimization may be performed, such as by the evolutionary algorithm component 240. At block 1010 a set of cost-feasible non-dominated solutions (or portfolios) may be provided.

At block 1012, the non-dominated solution set may be explored in an iterative fashion to identify trends and high-frequency projects that may provide robust value. Furthermore, the set of cost-feasible (within constraint) non-dominated portfolios, as determined at block 1010, may be provided to block 1014 to perform model diagnostics in an iterative fashion to identify sensitivity and sources of potential deficiencies in the value model. In some cases, such as when deficiencies in the value model is identified, the results of block 1016 and 1018 may be used to update the value models and return the model 1000 back to block 1006. In other cases, the method may proceed to block 1020, where value filters may be applied to further constrain the solution set of chromosomes. The further constraints may be based, at least in part, on other considerations, such as sustainability, integration, risk diversity, and resources that may be provided at block 1022. At block 1024, the top portfolio candidates associated with each stake holder may be identified. In some cases, the method 1000 may return to block 1006 to iterate through the method 1000 again. In other cases, the method 1000 may proceed to block 1026, where additional filters may be applied to generate a smaller number of "final" portfolios at block 1028.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
    receiving, by one or more master processors, an indication of one or more candidate projects, one or more sets of estimates of metrics associated with the one or more candidate projects, and one or more objectives for an initial due diligence of the one or more candidate projects;
    allocating, by the one or more master processors and based at least in part on work requests from one or more slave processors, the one or more sets of estimates of metrics associated with the one or more candidate projects to the one or more slave processors;
    performing, based at least in part on the one or more sets of estimates of metrics, an evolutionary algorithm to optimize to the one or more objectives, wherein the evolutionary algorithm comprises determining objective values corresponding to the one or more objectives using one or more slave processors;
    identifying, by the one or more master processors and based at least in part on performing the evolutionary algorithm, a plurality of non-dominated solutions, the non-dominated solutions representing an optimization according to the one or more objectives;
    determining, by the one or more master processors, a respective percentage (P) corresponding to each of the one or more candidate projects, wherein each respective percentage (P) is a percentage of the plurality of non-dominated solutions in which each of the corresponding one or more candidate projects are included;
    identifying, by the one or more master processors and based at least in part on the one or more sets of estimates, a respective confidence level (C) corresponding to each of the one or more candidate projects;
    generating, by the one or more master processors and based at least in part on the respective percentage (P) and the respective confidence level (C) corresponding to each of the one or more candidate projects, a respective priority score (R=P(I−C)) corresponding to each of the one or more candidate projects;
    providing, by the one or more master processors, an indication of each of the respective priority scores corresponding to each of the one or more candidate projects; and
    allocating due diligence funding to the one or more candidate projects according to the respective priority score (R) corresponding to the one or more candidate projects.

2. The method of claim 1, wherein each of the one or more sets of estimates of metrics corresponds to a respective stake holder.

3. The method of claim 1, wherein the one or more sets of estimates comprises at least one of: (i) expected benefits; (ii) risks associated with the project; (iii) cost estimates; (iv) time to completion; (v) importance to other projects.

4. The method of claim 1, further comprising receiving one or more constraints associated with the one or more projects.

5. The method of claim 1, wherein performing the evolutionary algorithm further comprises identifying at least one objective function associated with the one or more objectives.

6. The method of claim 1, wherein performing the evolutionary algorithm further comprises identifying, by the one or more processors, at least one epsilon value.

7. The method of claim 1, wherein a respective at least one of the plurality of non-dominated solutions correspond to each of the one or more sets of estimates of metrics.

8. The method of claim 1, further comprising receiving one or more second confidence levels associated with one or more of the estimates of the one one more sets of estimates.

9. The method of claim 8, wherein the respective confidence level (C) corresponding to each of the one or more candidate projects is based, at least in part, on the one or more second confidence levels.

10. A system, comprising:
    a memory that stores computer-executable instructions;
    a plurality of processors comprising at least one slave processor and at least one master processor, the plurality of processors configured to access the memory, wherein the plurality of processors are further configured to execute the computer-executable instructions to:
    receive, by the at least one master processor, an indication of one or more candidate projects, one or more sets of estimates of metrics associated with the one or more candidate projects, and one or more objectives for an initial due diligence of the one or more candidate projects;
    allocate, by the at least one master processor, and based at least in part on work requests from at least one slave processors, the one or more sets of estimates of metrics associated with the one or more candidate projects to the one or more slave processors;

perform, based at least in part on the one or more sets of estimates of metrics, an evolutionary algorithm to optimize to the one or more objectives, wherein the evolutionary algorithm comprises determining objective values corresponding to the one or more objectives using the at least one slave processors;

identify, based at least in part on performing the evolutionary algorithm, a plurality of non-dominated solutions, the non-dominated solutions representing an optimization according to the one or more objectives;

determine, by the at least one master processor, a respective percentage (P) corresponding to each of the one or more candidate projects, wherein each respective percentage (P) is a percentage of the plurality of nondominated solutions in which each of the corresponding one or more candidate projects are included;

identify, based at least in part on the one or more sets of estimates, a respective confidence level (C) corresponding to each of the one or more candidate projects;

generate, based at least in part on the respective percentage (P) and the respective confidence level (C) corresponding to each of the one or more candidate projects, a respective priority score (R=P(I−C)) corresponding to each of the one or more candidate projects;

provide, by the at least one master processor, an indication of each of the respective priority scores corresponding to each of the one or more candidate projects; and allocate due diligence funding to the one or more candidate projects according to the respective priority score (R) corresponding to the one or more candidate projects.

11. The system of claim 10, wherein each of the one or more sets of estimates of metrics corresponds to a respective stake holder.

12. The system of claim 10, wherein the one or more sets of estimates comprises at least one of: (i) expected benefits; (ii) risks associated with the project; (iii) cost estimates; (iv) time to completion; (v) importance to other projects.

13. The system of claim 10, wherein the plurality of processors are further configured to receive one or more constraints associated with the one or more projects.

14. The system of claim 10, wherein the plurality of processors configured to perform the evolutionary algorithm further comprises the plurality of processors configured to identify at least one objective function associated with the one or more objectives.

15. The system of claim 10, wherein the plurality of processors configured to perform the evolutionary algorithm further comprises the plurality of processors configured to identify at least one epsilon value.

16. The system of claim 10, wherein a respective at least one of the plurality of non-dominated solutions correspond to each of the one or more sets of estimates of metrics.

17. The system of claim 10, wherein the plurality of processors are further configured to receive one or more second confidence levels associated with one or more of the estimates of the one more sets of estimates.

18. The system of claim 17, wherein the respective confidence level (C) corresponding to each of the one or more candidate projects is based, at least in part, on the one or more second confidence levels.

* * * * *